United States Patent

Hayashi et al.

Patent Number: 5,827,911
Date of Patent: Oct. 27, 1998

[54] COLORED THERMOPLASTIC RESIN COMPOSITION

[75] Inventors: Akihiko Hayashi; Masataka Nishikawa, both of Osaka, Japan

[73] Assignee: Orient Chemical Industries, Ltd., Osaka, Japan

[21] Appl. No.: 837,707

[22] Filed: Apr. 22, 1997

[30] Foreign Application Priority Data

Apr. 23, 1996 [JP] Japan ..................... 8-127886

[51] Int. Cl.$^6$ ............. C08K 5/3465; C08K 5/521; C08K 5/41; C08K 5/101
[52] U.S. Cl. ................ 524/89; 524/127; 524/156; 524/157; 524/284
[58] Field of Search .................. 524/745, 710, 524/773, 755, 89, 127, 156, 157, 284

[56] References Cited

U.S. PATENT DOCUMENTS

| 4,648,905 | 3/1987 | Peck et al. ................. | 524/745 |
| 5,010,132 | 4/1991 | Morinaga et al. ............ | 524/745 |
| 5,648,191 | 7/1997 | Kato et al. ................. | 430/49 |

FOREIGN PATENT DOCUMENTS

| 60-43379 | 9/1985 | Japan . |
| 60-226551 | 11/1985 | Japan . |
| 61-236854 | 10/1986 | Japan . |
| 1-46524 | 10/1989 | Japan . |
| 3-50263 | 3/1991 | Japan . |
| 5-186633 | 7/1993 | Japan . |
| 5-230278 | 9/1993 | Japan . |
| 6-128479 | 5/1994 | Japan . |
| 6-212069 | 8/1994 | Japan . |

Primary Examiner—Jospeh L. Schofer
Assistant Examiner—Wu C. Cheng
Attorney, Agent, or Firm—McGlew & Tuttle

[57] ABSTRACT

Colored thermoplastic resin composition comprising a transparent thermoplastic resin and a black dye contained therein, wherein said black dye is a black dye obtained by reaction of at least one anionic surfactant selected from the group consisting of (a) sulfuric acid ester-series surfactants,
(b) phosphoric acid ester-series surfactants,
(c) sulfonic acid-series surfactants and
(d) carboxylic acid-series surfactants, and nigrosine.

15 Claims, 2 Drawing Sheets

COLORED THERMOPLASTIC RESIN COMPOSITION

BACKGROUND OF THE INVENTION

1. Field of the Invention

The present invention relates to a colored thermoplastic resin composition containing a black dye excellent in dispersibility in and/or compatibility with a transparent thermoplastic resin.

2. Description of the Prior Art

Being excellent in mechanical and chemical properties, thermoplastic resins are widely used for molded plastic products in the field of parts of automobiles, electric and electronic products, etc, and their demand is increasing in the field of engineering plastics. Also, there have been attempts to improve the heat resistance and chemical resistance of thermoplastic resins or to confer mechanical characteristics suited for various uses, by formulating a fibrous reinforcing material therein, to meet the requirements of a wide variety of industrial applications. In recent years, there has been a marked trend toward replacement of conventional metal parts of automobiles, bicycles, etc. with fiber-reinforced thermoplastic resin parts for the purpose of weight reduction, manufacturing process simplification and corrosion prevention.

Thermoplastic resins are colored for decoration, color identification, improvement of light fastness of molded products, content protection and shading and for other purposes; black coloring is industrially most important.

Also, colored resin molded products of high transparency such that the contents therein are visible have been increasingly used for bottles for detergents, cosmetics, drinking water, etc., some portions of automobile garage roofs, vegetable chambers of refrigerators, etc.; it is expected that such highly transparent colored resin molded products will be increasingly demanded.

In general, coloring agents for resins are required to be good in dispersibility in and/or compatibility with resins, heat resistance and sublimation resistance, as well as chemical resistance etc. Also, the colored resin products obtained are required to have brilliant color tone, light fastness, chemical resistance, migration resistance, good anti-bleeding property, etc.

For coloring a resin required to be transparent, in particular, dyes, rather than pigments, are preferred, because the resulting colored product is likely to be good in dispersibility in and/or compatibility with the resin and highly transparent. Also, because inorganic pigments provide turbid products than dyes, they are not used as blueing agents in cases where transparency is necessary. In comparison with pigments, however, many dyes are unsatisfactory in terms of light fastness and heat resistance.

Also, with such relatively poor heat resistance, dyes tend to undergo fading in heating processes such as during extrusion and during colored pellet drying before molding. Because the temperature distribution in the dryer used to dry colored pellets is not always uniform, resulting in high-temperature portions in some cases, uneven color hue can occur.

Traditionally, black coloring of thermoplastic resins has been achieved using various inorganic pigments and organic dyes/pigments such as carbon black, black metal complex dyes, azine dyes and perynone black and so on. Examples of known colored thermoplastic resins include thermoplastic resin compositions colored with carbon black, those colored with carbon black and nigrosine, those colored with nigrosine and a black metal complex dye, and those colored with nigrosine and a copper phthalocyanine pigment.

More specifically, colored thermoplastic resins include a molding formula comprising a polyamide resin colored with carbon black and nigrosine (Japanese Patent Examined Publication No. 43379/1985), a molding composition comprising a polyamide resin colored with carbon black and a copper phthalocyanine pigment (Japanese Patent Unexamined Publication No. 226551/1985), a molding composition comprising an unsaturated polyester resin colored with aniline black and solvent blue (Japanese Patent Examined Publication No. 46524/1989), a resin composition for colored master comprising a polycarbonate resin supplemented with carbon black (Japanese Patent Unexamined Publication No. 236854/1986), a plastic molding composition comprising a thermoplastic resin supplemented with carbon black and titanium oxide (Japanese Patent Unexamined Publication No. 186633/1993), and a colored resin composition comprising a thermoplastic resin colored with a red organic pigment, a blue organic pigment and a yellow organic pigment (Japanese Patent Unexamined Publication No. 230278/1993).

Also, examples of fiber-reinforced colored thermoplastic resins include a thermoplastic resin composition comprising a thermoplastic resin, a modified polyolefin, a fibrous reinforcing material and carbon black (Japanese Patent Unexamined Publication No. 50263/1991), a glass fiber-reinforced black polyamide resin composition comprising a polyamide resin, surface treated glass fiber and an azine dye (Japanese Patent Unexamined Publication No. 128479/1994), and reinforced polycarbonate resin composition comprising a polycarbonate resin, glass fiber and carbon black (Japanese Patent Unexamined Publication No. 212069/1994).

However, these conventional colored thermoplastic resin compositions do not always have good appearance and surface gloss, many of which undergo physical property deterioration, in comparison with the starting thermoplastic resin. Also, in recent years, there has been strong commercial demand for a thermoplastic resin composition possessing improved light fastness, since thermoplastic resin products have been widely used outdoors.

SUMMARY OF THE INVENTION

The object of the invention is to provide a colored thermoplastic resin composition which can be brilliantly colored without affecting the characteristics of the starting thermoplastic resin, which is good in appearance, surface gloss and mechanical properties, and which has sufficient light fastness and heat resistance, more specifically a colored thermoplastic resin composition which is excellent in transparency in low-density coloring.

The colored thermoplastic resin composition of the present invention for accomplishing the above object is a colored thermoplastic resin composition comprising a transparent thermoplastic resin and a black dye contained therein, wherein said black dye is a black dye obtained by reaction of at least one anionic surfactant selected from the group consisting of (a) sulfuric acid ester-series surfactants,
(b) phosphoric acid ester-series surfactants,
(c) sulfonic acid-series surfactants and
(d) carboxylic acid-series surfactants, and nigrosine.

Preferably, said anionic surfactant in the present invention is at least one compound selected from the group consisting of the compounds represented by the following formulas (I) through (IV).

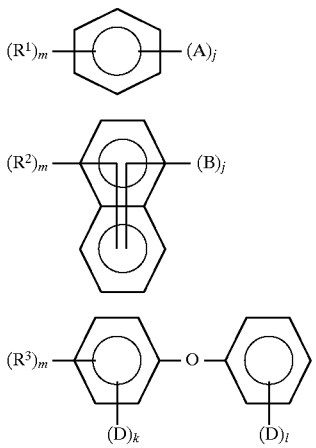

In formulas (I), (II) and (III),
each of $R^1$, $R^2$ and $R^3$ independently represents an alkyl group having 1 to 20 carbon atoms;
each of A, B and D independently represents $SO_3X$ [X represents H, an alkali metal or $NH_4$; the same applies below],
$CHR^4SO_3X$ [$R^4$ represents H, an alkyl group having 1 to 20 carbon atoms, or an aryl group or aralkyl group that is substituted or not substituted by an alkyl group],
$OSO_3X$,
$O(CH_2CH_2O)_nSO_3X$,
$O(CH_2CH_2O)_nCH_2CH_2SO_3X$,
$OPO(OX)(Y)$ [Y represents OH, OM (M represents an alkali metal), $ONH_4$ or $(OCH_2CH_2)_nOR^5$ (n represents a positive integer;
$R^5$ represents an alkyl group having 1 to 20 carbon atoms or an aryl group that is substituted or not substituted by an alkyl group); the same applies below], or
$O(CH_2CH_2O)_nPO(OX)(Y)$;
j represents an integer from 1 to 3;
each of k and l represents an integer from 0 to 3, excluding the case wherein both k and l are 0;
m represents 1 or 2, $$C_qH_fCOOE \qquad (IV)$$

In formula (IV), q represents an integer from 10 to 20; f represents 2q+1 or 2q−1; E represents H, an alkali metal or an alkaline earth metal.

The present inventors found that it is possible to brilliantly color a thermoplastic resin having uniform surface gloss with almost no dye discoloration or fading during mixing, kneading and molding and to achieve smooth molding treatment without affecting the fluidity of the thermoplastic resin, by coloring the thermoplastic resin with a black dye obtained by reaction of at least one anionic surfactant selected from the group consisting of (a) sulfuric acid ester-series surfactants, (b) phosphoric acid ester-series surfactants, (c) sulfonic acid-series surfactants and (d) carboxylic acid-series surfactants, and nigrosine, more specifically a black dye with improved dispersibility and/or compatibility obtained by reaction of at least one anionic surfactant selected from the group consisting of the anionic surfactants represented by formulas (I) through (IV) above, and nigrosine, and that the resulting molded product is good in light fastness and heat resistance, with good mechanical properties undergoing almost no deterioration by the black dye, and is excellently transparent at low coloring densities.

The present inventors made further investigation based on this finding, and developed the present invention.

The black dye in the present invention surpasses conventional nigrosines in terms of dispersibility in and/or compatibility with synthetic resins, and provides excellent heat resistance and light fastness for the molded synthetic resins colored therewith. For these reasons, it allows satisfactorily uniform coloring of thermoplastic resins, in which dispersibility has been problematic in conventional nigrosines. This difference is conspicuous in polycarbonate resin, polystyrene resin, polyethylene terephthalate resin, acrylonitrile-styrene copolymer resin and acrylic resin.

Also, the colored thermoplastic resin composition of the present invention surpasses thermoplastic resin compositions colored with black pigments (e.g., carbon black) or conventional nigrosines in terms of molded product transparency. For this reason, it serves as the ideal colored thermoplastic resin composition employing an excellently transparent thermoplastic resin (e.g., polycarbonate resin).

Accordingly, the colored thermoplastic resin composition of the present invention can be brilliantly colored black with transparency without affecting the characteristics of the starting thermoplastic resin, is good in appearance, surface gloss and mechanical properties, and has excellent light fastness and heat resistance, with very little color hue change over time. It is excellent in Izod impact value and elongation, in comparison with colored thermoplastic resin compositions wherein the coloring agent is a black pigment such as carbon black. The present invention provides a molded product of colored thermoplastic resin with excellent transparency by low-density coloring.

DETAILED DESCRIPTION OF THE INVENTION

The nigrosine as the starting material for the black dye in the present invention may be a black azine condensed mixture like that described in the COLOR INDEX as C.I. SOLVENT BLACK 5 or C.I. SOLVENT BLACK 7. Its synthesis can be achieved by, for example, oxidizing and dehydrate-condensing aniline, aniline hydrochloride and nitrobenzene in the presence of iron chloride at a reaction temperature of 160° to 180° C. Nigrosine is produced as a mixture of various different compounds, depending on reaction conditions, charged materials and charging ratio, and is assumed to be a mixture of various azine compounds such as triphenazineoxazine and phenazineazine and so on.

Examples of commercial nigrosine products that serve as a starting material for the black dye in the present invention include Spirit Black SB and Spirit Black AB (both categorized under C.I. SOLVENT BLACK 5); and NIGROSINE BASE SA, NIGROSINE BASE EE, NIGROSINE BASE EX and NIGROSINE BASE EX-BP (all categorized under C.I. SOLVENT BLACK 7) [all trade names for nigrosine products of Orient Chemical Industries Ltd.].

The black dye used in the present invention is obtained by reaction of a conventional nigrosine and at least one anionic surfactant selected from the group consisting of (a) sulfuric acid ester-series surfactants, (b) phosphoric acid ester-series surfactants, (c) sulfonic acid-series surfactants and (d) carboxylic acid-series surfactants [preferably at least one anionic surfactant selected from the group consisting of the anionic surfactants represented by formulas (I) through (IV) above]. Accordingly, the reaction may be a reaction of one of these anionic surfactants and a nigrosine, or a reaction of a mixture of two or more of these anionic surfactants and a nigrosine. Also, the colored thermoplastic resin composition of the present invention may incorporate some nigrosine remaining unreacted with the anionic surfactant, in addition to the above-described black dye.

Examples of anionic surfactants (a) through (d) above are given below.

(a) Sulfuric acid ester-series surfactants include
higher alcohol sulfuric acid esters and salts thereof,
aryl sulfuric acid esters and salts thereof,
secondary alcohol sulfuric acid esters and salts thereof,
olefine sulfuric acid esters and salts thereof,
fatty acid ethylene glycollide sulfuric acid esters and salts thereof,
alkyl polyoxyethylene ether sulfuric acid esters and salts thereof,
aryl polyoxyethylene ether sulfuric acid esters and salts thereof,
fatty acid monoglyceride sulfuric acid esters and salts thereof,
fatty acid polyhydric alcohol sulfuric acid esters and salts thereof,
fatty acid alkyl sulfuric acid esters and salts thereof,
fatty acid amide sulfuric acid esters and salts thereof,
aromatic carboxylic acid amide sulfuric acid esters and salts thereof,
fatty acid anilide sulfuric acid esters and salts thereof, and
fatty acid monoalkanolamide sulfuric acid esters and salts thereof.

(b) Phosphoric acid ester-series surfactants include
alkylphosphoric acid esters and salts thereof,
arylphosphoric acid esters and salts thereof,
alkyl polyoxyethylene ether phosphoric acid esters and salts thereof, and
aryl polyoxyethylene ether phosphoric acid esters and salts thereof.

(c) Sulfonic acid-series surfactants include
alkanesulfonic acids and salts thereof,
arylsulfonic acids and salts thereof,
α-olefinic sulfonic acids and salts thereof,
α-sulfofatty acids and salts thereof,
sulfoethanol fatty acid esters and salts thereof,
sulfopolyoxyethylene fatty acid esters and salts thereof,
alkylsulfoacetic acids and salts thereof,
dialkylsulfosuccinic acids and salts thereof,
monoalkylsulfosuccinic acids and salts thereof,
sulfosuccinic acid monoalkylamides and salts thereof,
fatty acid amidosulfonic acids and salts thereof,
arylpolyoxyethylene ethanesulfonic acids and salts thereof,
hydroxyarylsulfonic acids and salts thereof,
diphenylmethanesulfonic acids and salts thereof,
dinaphthylmethanesulfonic acids and salts thereof, and
alkyl diphenyl ether sulfonic acids and salts thereof.

(d) Carboxylic acid-series surfactants include
fatty acids and salts thereof,
alkyl ether carboxylic acids and salts thereof,
N-acylamino acids and salts thereof,
naphthenic acids and salts thereof,
fatty acids of aliphatic amines and aliphatic amides and salts thereof, and
aromatic carboxylic acids of aliphatic amines and aliphatic amides and salts thereof.

Examples of the anionic surfactants represented by formulas (I) through (IV) above are given below.

Examples of the compounds represented by formula (I) include
alkylbenzenesulfonic acids and salts thereof,
alkylbenzenedisulfonic acids and salts thereof,
alkylbenzenetrisulfonic acids and salts thereof,
dialkylbenzenesulfonic acids and salts thereof,
dialkylbenzenedisulfonic acids and salts thereof,
alkylphenylsulfuric acid esters and salts thereof,
alkylphenyldi(sulfuric acid esters) and salts thereof,
alkylbenzylsulfonic acids and salts thereof,
alkylphenyldi(methanesulfonic acids) and salts thereof,
alkylphenyl(alkyl)methanesulfonic acids and salts thereof,
alkylphenyl(alkylphenyl)methanesulfonic acids and salts thereof,
alkylphenyl polyoxyethylene ether sulfuric acid esters and salts thereof,
alkylphenyl di(polyoxyethylene ether sulfuric acid esters) and salts thereof,
alkylphenyl tri(polyoxyethylene ether sulfuric acid esters) and salts thereof,
alkylphenyl polyoxyethylene ether ethanesulfonic acids and salts thereof,
alkylphenyl di(polyoxyethylene ether ethanesulfonic acids) and salts thereof,
alkylphenyl polyoxyethylene ether phosphoric acid esters and salts thereof,
alkylphenyl di(polyoxyethylene ether phosphoric acid esters) and salts thereof,
alkylphenyl polyoxyethylene ether phosphoric acid diesters and salts thereof,
alkylphenylphosphoric acid esters and salts thereof, and
alkylphenyldi(phosphoric acid esters) and salts thereof.

Preference is given to monoalkylbenzenesulfonic acids and salts thereof,
alkylphenyl polyoxyethylene ether sulfuric acid esters and salts thereof,
alkylphenyl polyoxyethylene ether phosphoric acid esters and salts thereof, and
alkylphenyl polyoxyethylene ether ethanesulfonic acids and salts thereof.

More specific examples of the alkylbenzenesulfonic acid represented by formula (I) and the salt thereof [formula (1) below]

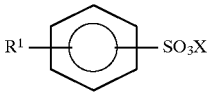
(1)

[$R^1$ represents an alkyl group having 1 to 20 carbon atoms; X represents H, an alkali metal or $NH_4$] include
n-propylbenzenesulfonic acids and salts thereof,
tert-butylbenzenesulfonic acids and salts thereof,
hexylbenzenesulfonic acids and salts thereof,
octylbenzenesulfonic acids and salts thereof,
nonylbenzenesulfonic acids and salts thereof,
dodecylbenzenesulfonic acids and salts thereof,
stearylbenzenesulfonic acids and salts thereof,
tetradecylbenzenesulfonic acids and salts thereof,
hexadecylbenzenesulfonic acids and salts thereof,
octadecylbenzenesulfonic acids and salts thereof,
2-ethylhexylbenzenesulfonic acids and salts thereof,
2-butyloctylbenzenesulfonic acids and salts thereof,
2-amylnonylbenzenesulfonic acids and salts thereof, and
n-propylheptylbenzenesulfonic acids and salts thereof.

Useful alkylbenzenesulfonic acid derivatives include
NEWREX BASE H, NEWREX POWDER F, NEWREX R, NEWREX BASE SOFT 30, NEWREX BASE SOFT 60, NEWREX RS, OSEN A, SOFT SENZAI 550A, SOFT SENZAI 5S and OSEN S (all produced by NOF Corporation, trade names);
NEOPELEX 05 POWDER, NEOPELEX No6, NEOPELEX F-60, NEOPELEX F-25 and NEOPELEX No1F POWDER (all produced by Kao Corporation, trade names);

SANDET 60 (produced by Sanyo Kasei Co., Ltd., trade name); NEOGEN R and NEOGEN SC (both produced by Dai-ichi Kogyo Seiyaku Co., Ltd., trade names);

MINELITE LA, MINELITE 100, MINELITE 200, LIGHT-CLEAN P and EMAMINE CS (all produced by Kyoeisha Yushi Kagaku Kogyo, trade names);

LUMINOX 100, LUMINOX S-100, LUMINOX P-80 and LUMINOX P-05L (all produced by Toho Chemical Industry Co., Ltd., trade names);

LIPON LH-200, LIPON LH-500, LIPON LH-600, LIPON LH-900, LIPON LS-250, LIPON LS-625, LIPON LT-240, LIPON LT-270, LIPON LC-960, LIPON PS-230, LIPON PS-260 and LIPON PS-860 (all produced by Lion Corporation, trade names);

LAVAJON C (produced by Matsumoto Yushi Co., Ltd., trade name); and

DBS-100, DBS-90, SBS-100, DBS-12-100, SBS-13-100, DBN-600 and SBN-12-65 (all produced by Teikoku Kako Co., Ltd., trade names).

More specific examples of the alkylbenzenedisulfonic acid represented by formula (I) and the salt thereof [formula (2) below]

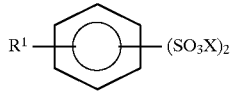
(2)

[$R^1$ represents an alkyl group having 1 to 20 carbon atoms; X represents H, an alkali metal or $NH_4$] include
n-propylbenzenedisulfonic acids and salts thereof,
tert-butylbenzenedisulfonic acids and salts thereof,
hexylbenzenedisulfonic acids and salts thereof,
octylbenzenedisulfonic acids and salts thereof,
nonylbenzenedisulfonic acids and salts thereof,
dodecylbenzenedisulfonic acids and salts thereof,
stearylbenzenedisulfonic acids and salts thereof,
tetradecylbenzenedisulfonic acids and salts thereof,
hexadecylbenzenedisulfonic acids and salts thereof,
octadecylbenzenedisulfonic acids and salts thereof,
2-ethylhexylbenzenedisulfonic acids and salts thereof,
2-butyloctylbenzenedisulfonic acids and salts thereof,
2-amylnonylbenzenedisulfonic acids and salts thereof, and
n-propylheptylbenzenedisulfonic acids and salts thereof.

More specific examples of the alkylbenzenetrisulfonic acid represented by formula (I) and the salt thereof [formula (3) below]

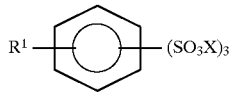
(3)

[$R^1$ represents an alkyl group having 1 to 20 carbon atoms; X represents H, an alkali metal or $NH_4$] include
n-propylbenzenetrisulfonic acids and salts thereof,
tert-butylbenzenetrisulfonic acids and salts thereof,
hexylbenzenetrisulfonic acids and salts thereof,
octylbenzenetrisulfonic acids and salts thereof,
nonylbenzenetrisulfonic acids and salts thereof,
dodecylbenzenetrisulfonic acids and salts thereof,
stearylbenzenetrisulfonic acids and salts thereof,
tetradecylbenzenetrisulfonic acids and salts thereof,
hexadecylbenzenetrisulfonic acids and salts thereof,
octadecylbenzenetrisulfonic acids and salts thereof,
2-ethylhexylbenzenetrisulfonic acids and salts thereof,
2-butyloctylbenzenetrisulfonic acids and salts thereof,
2-amylnonylbenzenetrisulfonic acids and salts thereof, and
n-propylheptylbenzenetrisulfonic acids and salts thereof.

More specific examples of the dialkylbenzenesulfonic acid represented by formula (I) and the salt thereof [formula (4) below]

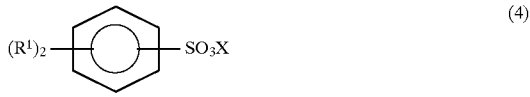
(4)

[$R^1$ represents an alkyl group having 1 to 20 carbon atoms; X represents H, an alkali metal or $NH_4$] include
di(n-propyl)benzenesulfonic acids and salts thereof,
di(tert-butyl)benzenesulfonic acids and salts thereof,
dihexylbenzenesulfonic acids and salts thereof,
dioctylbenzenesulfonic acids and salts thereof,
dinonylbenzenesulfonic acids and salts thereof,
didodecylbenzenesulfonic acids and salts thereof,
distearylbenzenesulfonic acids and salts thereof,
ditetradecylbenzenesulfonic acids and salts thereof,
dihexadecylbenzenesulfonic acids and salts thereof,
dioctadecylbenzenesulfonic acids and salts thereof,
di(2-ethylhexyl)benzenesulfonic acids and salts thereof,
di(2-butyloctyl)benzenesulfonic acids and salts thereof,
di(2-amylnonyl)benzenesulfonic acids and salts thereof, and
di(n-propylheptyl)benzenesulfonic acids and salts thereof.

More specific examples of the dialkylbenzenedisulfonic acid represented by formula (I) and the salt thereof [formula (5) below]

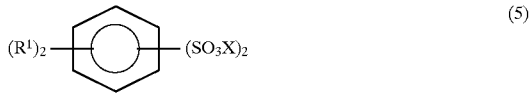
(5)

[$R^1$ represents an alkyl group having 1 to 20 carbon atoms; X represents H, an alkali metal or $NH_4$] include
di(n-propyl)benzenedisulfonic acids and salts thereof,
di(tert-butyl)benzenedisulfonic acids and salts thereof,
dihexylbenzenedisulfonic acids and salts thereof,
dioctylbenzenedisulfonic acids and salts thereof,
dinonylbenzenedisulfonic acids and salts thereof,
didodecylbenzenedisulfonic acids and salts thereof,
distearylbenzenedisulfonic acids and salts thereof,
ditetradecylbenzenedisulfonic acids and salts thereof,
dihexadecylbenzenedisulfonic acids and salts thereof,
dioctadecylbenzenedisulfonic acids and salts thereof,
di(2-ethylhexyl)benzenedisulfonic acids and salts thereof,
di(2-butyloctyl)benzenedisulfonic acids and salts thereof,
di(2-amylnonyl)benzenedisulfonic acids and salts thereof, and
di(n-propylheptyl)benzenedisulfonic acids and salts thereof.

More specific examples of the alkylphenylsulfuric acid ester represented by formula (I) and the salt thereof [formula (6) below]

(6)

[$R^1$ represents an alkyl group having 1 to 20 carbon atoms; X represents H, an alkali metal or $NH_4$] include
n-propylphenylsulfuric acid esters and salts thereof,
tert-butylphenylsulfuric acid esters and salts thereof,
hexylphenylsulfuric acid esters and salts thereof,
octylphenylsulfuric acid esters and salts thereof,
nonylphenylsulfuric acid esters and salts thereof,
dodecylphenylsulfuric acid esters and salts thereof,
stearylphenylsulfuric acid esters and salts thereof,
tetradecylphenylsulfuric acid esters and salts thereof, hexadecylphenylsulfuric acid esters and salts thereof,
octadecylphenylsulfuric acid esters and salts thereof,
2-ethylhexylphenylsulfuric acid esters and salts thereof,
2-butyloctylphenylsulfuric acid esters and salts thereof,
2-amylnonylphenylsulfuric acid esters and salts thereof, and
n-propylheptylphenylsulfuric acid esters and salts thereof.

More specific examples of the alkylbenzylsulfonic acid represented by formula (I) and the salt thereof [formula (7) below]

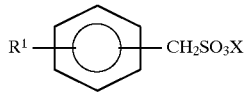
(7)

[$R^1$ represents an alkyl group having 1 to 20 carbon atoms; X represents H, an alkali metal or $NH_4$] include
n-propylbenzylsulfonic acids and salts thereof,
tert-butylbenzylsulfonic acids and salts thereof,
hexylbenzylsulfonic acids and salts thereof,
octylbenzylsulfonic acids and salts thereof,
nonylbenzylsulfonic acids and salts thereof,
dodecylbenzylsulfonic acids and salts thereof,
stearylbenzylsulfonic acids and salts thereof,
tetradecylbenzylsulfonic acids and salts thereof,
hexadecylbenzylsulfonic acids and salts thereof,
octadecylbenzylsulfonic acids and salts thereof,
2-ethylhexylbenzylsulfonic acids and salts thereof,
2-butyloctylbenzylsulfonic acids and salts thereof,
2-amylnonylbenzylsulfonic acids and salts thereof, and
n-propylheptylbenzylsulfonic acids and salts thereof.

More specific examples of the alkylphenyl(alkyl)methanesulfonic acid represented by formula (I) and the salt thereof [formula (8) below]

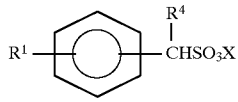
(8)

[$R^1$ represents an alkyl group having 1 to 20 carbon atoms; $R^4$ represents H, an alkyl group having 1 to 20 carbon atoms, or an aryl group or aralkyl group that is substituted or not substituted by an alkyl group; X represents H, an alkali metal or $NH_4$] include
n-propylphenyl(n-butyl)methanesulfonic acids and salts thereof,
n-propylphenyl(octyl)methanesulfonic acids and salts thereof
n-propylphenyl(tosyl)methanesulfonic acids and salts thereof,
n-propylphenyl(isopropylphenyl)methanesulfonic acids and salts thereof,
tert-butylphenyl(heptyl)methanesulfonic acids and salts thereof,
hexylphenyl(tert-butyl)methanesulfonic acids and salts thereof,
hexylphenyl(nonylphenyl)methanesulfonic acids and salts thereof,
octylphenyl(dodecylphenyl)methanesulfonic acids and salts thereof,
nonylphenyl(ethyl)methanesulfonic acids and salts thereof,
dodecylphenyl(dodecyl)methanesulfonic acids and salts thereof,
stearylphenyl(octyl)methanesulfonic acids and salts thereof,
tetradecylphenyl(tosyl)methanesulfonic acids and salts thereof,
hexadecylphenyl(tert-butyl)methanesulfonic acids and salts thereof,
octadecylphenyl(stearyl)methanesulfonic acids and salts thereof,
2-ethylhexylphenyl(hexyl)methanesulfonic acids and salts thereof,
2-butyloctylphenyl(dodecyl)methanesulfonic acids and salts thereof,
2-amylnonylphenyl(hexadecyl)methanesulfonic acids and salts thereof, and
n-propylheptylphenyl(isopropylphenyl)methanesulfonic acids and salts thereof.

More specific examples of the alkylphenyl polyoxyethylene ether sulfuric acid ester represented by formula (I) and the salt thereof [formula (9) below]

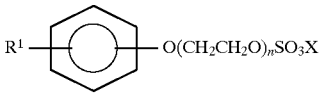
(9)

[$R^1$ represents an alkyl group having 1 to 20 carbon atoms; X represents H, an alkali metal or $NH_4$; n is a positive integer] include
n-butylphenyl polyoxyethylene ether sulfuric acid esters and salts thereof,
tert-butylphenyl polyoxyethylene ether sulfuric acid esters and salts thereof,
octylphenyl polyoxyethylene ether sulfuric acid esters and salts thereof,
nonylphenyl polyoxyethylene ether sulfuric acid esters and salts thereof,
dodecylphenyl polyoxyethylene ether sulfuric acid esters and salts thereof,
hexadecylphenyl polyoxyethylene ether sulfuric acid esters and salts thereof,
stearylphenyl polyoxyethylene ether sulfuric acid esters and salts thereof,
tetradecylphenyl polyoxyethylene ether sulfuric acid esters and salts thereof,
2-ethylhexylphenyl polyoxyethylene ether sulfuric acid esters and salts thereof,
2-butyloctylphenyl polyoxyethylene ether sulfuric acid esters and salts thereof,
2-amylnonylphenyl polyoxyethylene ether sulfuric acid esters and salts thereof, and
n-propylheptylphenyl polyoxyethylene ether sulfuric acid esters and salts thereof.

Useful alkylphenyl polyoxyethylene ether sulfuric acid esters and salts thereof include
EMAL NC-35 and LEVENOL WZ (both produced by Kao Corporation, trade names);
NONIPOL S-40 (produced by Sanyo Kasei Co., Ltd., trade name);
HITENOL N-07, HITENOL N-08, HITENOL N-17, HITENOL NE-05, HITENOL NE-15 and HITENOL NF13 (all produced by Dai-ichi Kogyo Seiyaku Co., Ltd., trade names);
PELETEX 1220S (produced by Miyoshi Oil & Fat Co., Ltd., trade name);
and SUN NOL NP-2030, SUN NOL OP-2630, SUN NOL NP-1530, SUN NOL NP-1930, SUN NOL NP-6130 and SUN NOL OP-3330 (all produced by Lion Corporation, trade names).

More specific examples of the alkylphenyl polyoxyethylene ether ethanesulfonic acid represented by formula (I) and the salt thereof [formula (10) below]

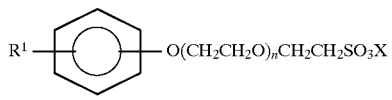 (10)

[$R^1$ represents an alkyl group having 1 to 20 carbon atoms; X represents H, an alkali metal or $NH_4$; n is a positive integer] include n-butylphenyl polyoxyethylene ether ethanesulfonic acids and salts thereof,
tert-butylphenyl polyoxyethylene ether ethanesulfonic acids and salts thereof,
octylphenyl polyoxyethylene ether ethanesulfonic acids and salts thereof,
nonylphenyl polyoxyethylene ether ethanesulfonic acids and salts thereof,
dodecylphenyl polyoxyethylene ether ethanesulfonic acids and salts thereof,
hexadecylphenyl polyoxyethylene ether ethanesulfonic acids and salts thereof,
stearylphenyl polyoxyethylene ether ethanesulfonic acids and salts thereof,
tetradecylphenyl polyoxyethylene ether ethanesulfonic acids and salts thereof,
2-ethylhexylphenyl polyoxyethylene ether ethanesulfonic acids and salts thereof,
2-butyloctylphenyl polyoxyethylene ether ethanesulfonic acids and salts thereof,
2-amylnonylphenyl polyoxyethylene ether ethanesulfonic acids and salts thereof, and
n-propylheptylphenyl polyoxyethylene ether ethanesulfonic acids and salts thereof.

Useful alkylphenyl polyoxyethylene ether ethanesulfonic acids and salts thereof include
LIONOL OAI-N, LIONOL OBI and LIONOL OBI-N (all produced by Lion Corporation, trade names).

More specific examples of the alkylphenylphosphoric acid ester represented by formula (I) and the salt thereof [formula (11) below]

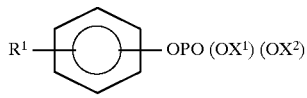 (11)

[$R^1$ represents an alkyl group having 1 to 20 carbon atoms; each of $X^1$ and $X^2$ independently represents H, an alkali metal or $NH_4$] include n-butylphenylphosphoric acid esters and salts thereof,
tert-butylphenylphosphoric acid esters and salts thereof,
octylphenylphosphoric acid esters and salts thereof,
nonylphenylphosphoric acid esters and salts thereof,
dodecylphenylphosphoric acid esters and salts thereof,
hexadecylphenylphosphoric acid esters and salts thereof,
stearylphenylphosphoric acid esters and salts thereof,
tetradecylphenylphosphoric acid esters and salts thereof,
2-ethylhexylphenylphosphoric acid esters and salts thereof,
2-butyloctylphenylphosphoric acid esters and salts thereof,
2-amylnonylphenylphosphoric acid esters and salts thereof, and
n-propylheptylphenylphosphoric acid esters and salts thereof.

More specific examples of the alkylphenyl polyoxyethylene ether phosphoric acid ester represented by formula (I) and the salt thereof [formula (12) below]

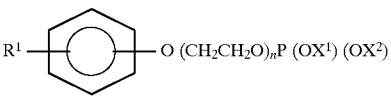 (12)

[$R^1$ represents an alkyl group having 1 to 20 carbon atoms; each of $X^1$ and $X^2$ independently represents H, an alkali metal or $NH_4$;
n is a positive integer] include n-butylphenyl polyoxyethylene ether phosphoric acid esters and salts thereof,
tert-butylphenyl polyoxyethylene ether phosphoric acid esters and salts thereof,
octylphenyl polyoxyethylene ether phosphoric acid esters and salts thereof,
nonylphenyl polyoxyethylene ether phosphoric acid esters and salts thereof,
dodecylphenyl polyoxyethylene ether phosphoric acid esters and salts thereof,
hexadecylphenyl polyoxyethylene ether phosphoric acid esters and salts thereof,
stearylphenyl polyoxyethylene ether phosphoric acid esters and salts thereof,
tetradecylphenyl polyoxyethylene ether phosphoric acid esters and salts thereof,
2-ethylhexylphenyl polyoxyethylene ether phosphoric acid esters and salts thereof,
2-butyloctylphenyl polyoxyethylene ether phosphoric acid esters and salts thereof,
2-amylnonylphenyl polyoxyethylene ether phosphoric acid esters and salts thereof, and
n-propylheptylphenyl polyoxyethylene ether phosphoric acid esters and salts thereof.

Useful alkylphenyl polyoxyethylene ether phosphoric acid esters and salts thereof include
PLYSURF A212E, PLYSURF A217E, PLYSURF A210G and PLYSURF A207H (all produced by Dai-ichi Kogyo Seiyaku Co., Ltd., trade names); and
PHOSPHANOL RE-410, PHOSPHANOL RE-510, PHOSPHANOL RE-610, PHOSPHANOL RE-960, PHOSPHANOL RM-410, PHOSPHANOL RM-510, PHOSPHANOL RM-710, PHOSPHANOL RE-210, PHOSPHANOL RP-710 and PHOSPHANOL LO-529 (all produced by Toho Chemical Industry Co., Ltd., trade names).

More specific examples of the alkylphenyl polyoxyethylene ether phosphoric acid diester represented by formula (I) and the salt thereof [formula (13) below]

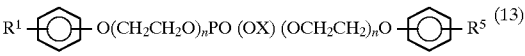 (13)

[$R^1$ represents an alkyl group having 1 to 20 carbon atoms; $R^5$ represents an alkyl group; X represents H, an alkali metal or $NH_4$; n is a positive integer] include n-butylphenyl polyoxyethylene ether (octylphenyl polyoxyethylene ether) phosphoric acid esters and salts thereof,
tert-butylphenyl polyoxyethylene ether (dodecylphenyl polyoxyethylene ether) phosphoric acid esters and salts thereof,
octylphenyl polyoxyethylene ether (2-ethylhexylphenyl polyoxyethylene ether) phosphoric acid esters and salts thereof,
bis(nonylphenyl polyoxyethylene ether) phosphoric acid esters and salts thereof,
bis(octylphenyl polyoxyethylene ether) phosphoric acid esters and salts thereof,
bis(dodecylphenyl polyoxyethylene ether) phosphoric acid esters and salts thereof, hexadecylphenyl polyoxyethylene ether (octylphenyl polyoxyethylene ether) phosphoric acid esters and salts thereof,
stearylphenyl polyoxyethylene ether (nonylphenyl polyoxyethylene ether) phosphoric acid esters and salts thereof,
tetradecylphenyl polyoxyethylene ether (isopropylphenyl polyoxyethylene ether) phosphoric acid esters and salts thereof,
2-ethylhexylphenyl polyoxyethylene ether (dodecylphenyl polyoxyethylene ether) phosphoric acid esters and salts thereof,
2-butyloctylphenyl polyoxyethylene ether (stearylphenyl polyoxyethylene ether) phosphoric acid esters and salts thereof,
2-amylnonylphenyl polyoxyethylene ether (stearylphenyl polyoxyethylene ether) phosphoric acid esters and salts thereof,
hexylphenyl polyoxyethylene ether (dodecylphenyl polyoxyethylene ether) phosphoric acid esters and salts thereof, and
n-propylheptylphenyl polyoxyethylene ether (octylphenyl polyoxyethylene ether) phosphoric acid esters and salts thereof.

Examples of the compounds represented by formula (II) include
alkylnaphthalenesulfonic acids and salts thereof,
alkylnaphthalenedisulfonic acids and salts thereof,
alkylnaphthalenetrisulfonic acids and salts thereof,
dialkylnaphthalenesulfonic acids and salts thereof,
dialkylnaphthalenedisulfonic acids and salts thereof,
alkylnaphthalene sulfuric acid esters and salts thereof,
dialkylnaphthalene sulfuric acid esters and salts thereof,
alkylnaphthylmethanesulfonic acids and salts thereof,
dialkylnaphthylmethanesulfonic acid s and salts thereof,
alkylnaphthyl polyoxyethylene ether sulfuric acid esters and salts thereof,
alkylnaphthyldi(polyoxyethylene ether sulfuric acid esters) and salts thereof,
alkylnaphthyltri(polyoxyethylene ether sulfuric acid esters) and salts thereof,
alkylnaphthyl polyoxyethylene ether ethanesulfonic acids and salts thereof,
alkylnaphthyldi(polyoxyethylene ether ethanesulfonic acids) and salts thereof,
alkylnaphthyl phosphoric acid esters and salts thereof,
alkylnaphthyldi(phosphoric acid esters) and salts thereof,
alkylnaphthyl polyoxyethylene ether phosphoric acid esters and salts thereof,
alkylnaphthyldi(polyoxyethylene ether phosphoric acid esters) and salts thereof, and
alkylnaphthyl polyoxyethylene ether phosphoric acid diesters and salts thereof.

Preference is given to monoalkylnaphthalenesulfonic acids and salts thereof,
monoalkylnaphthalenedisulfonic acids and salts thereof,
monoalkylnaphthalenetrisulfonic acids and salts thereof,
alkylnaphthalenesulfuric acid esters and salts thereof,
alkylnaphthyl polyoxyethylene ether sulfuric acid esters and salts thereof,
alkylnaphthyldi(polyoxyethylene ether sulfuric acid esters) and salts thereof, and
alkylnaphthyl polyoxyethylene ether ethanesulfonic acids and salts thereof.

More specific examples of the alkylnaphthalenesulfonic acid represented by formula (II) and the salt thereof [formula (14) below]

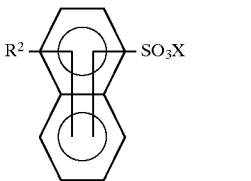

[$R^2$ represents an alkyl group having 1 to 20 carbon atoms; X represents H, an alkali metal or $NH_4$] include n-propylnaphthalenesulfonic acids and salts thereof,
tert-butylnaphthalenesulfonic acids and salts thereof,
hexylnaphthalenesulfonic acids and salts thereof,
octylnaphthalenesulfonic acids and salts thereof,
nonylnaphthalenesulfonic acids and salts thereof,
dodecylnaphthalenesulfonic acids and salts thereof,
tetradecylnaphthalenesulfonic acids and salts thereof,
hexadecylnaphthalenesulfonic acids and salts thereof,
octadecylnaphthalenesulfonic acids and salts thereof,
2-ethylhexylnaphthalenesulfonic acids and salts thereof,
2-butyloctylnaphthalenesulfonic acids and salts thereof,
2-amylnonylnaphthalenesulfonic acids and salts thereof, and
n-propylheptylnaphthalenesulfonic acids and salts thereof.

Useful alkylnaphthalenesulfonic acid derivatives include PELEX NB Paste and PELEX NB-L (both produced by Kao Corporation, trade names); and
SOLVALITE BX (produced by Kyoeisha Yushi Kagaku Kogyo, trade name).

More specific examples of the alkylnaphthalenedisulfonic acid represented by formula (II) and the salt thereof [formula (15) below]

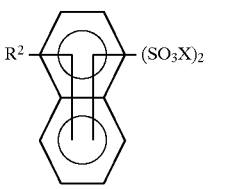

[$R^2$ represents an alkyl group having 1 to 20 carbon atoms; X represents H, an alkali metal or $NH_4$] include n-propylnaphthalenedisulfonic acids and salts thereof,
tert-butylnaphthalenedisulfonic acids and salts thereof,
hexylnaphthalenedisulfonic acids and salts thereof,
octylnaphthalenedisulfonic acids and salts thereof,
nonylnaphthalenedisulfonic acids and salts thereof,
dodecylnaphthalenedisulfonic acids and salts thereof,
tetradecylnaphthalenedisulfonic acids and salts thereof,
hexadecylnaphthalenedisulfonic acids and salts thereof,
octadecylnaphthalenedisulfonic acids and salts thereof,
2-ethylhexylnaphthalenedisulfonic acids and salts thereof,
2-butyloctylnaphthalenedisulfonic acids and salts thereof,
2-amylnonylnaphthalenedisulfonic acids and salts thereof, and
n-propylheptylnaphthalenedisulfonic acids and salts thereof.

More specific examples of the alkylnaphthalenetrisulfonic acid represented by formula (II) and the salt thereof [formula (16) below]

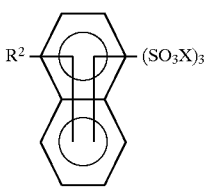

(16)

[R² represents an alkyl group having 1 to 20 carbon atoms; X represents H, an alkali metal or NH₄] include
n-propylnaphthalenetrisulfonic acids and salts thereof,
tert-butylnaphthalenetrisulfonic acids and salts thereof,
hexylnaphthalenetrisulfonic acids and salts thereof,
octylnaphthalenetrisulfonic acids and salts thereof,
nonylnaphthalenetrisulfonic acids and salts thereof,
dodecylnaphthalenetrisulfonic acids and salts thereof,
tetradecylnaphthalenetrisulfonic acids and salts thereof,
hexadecylnaphthalenetrisulfonic acids and salts thereof,
octadecylnaphthalenetrisulfonic acids and salts thereof,
2-ethylhexylnaphthalenetrisulfonic acids and salts thereof,
2-butyloctylnaphthalenetrisulfonic acids and salts thereof,
2-amylnonylnaphthalenetrisulfonic acids and salts thereof, and
n-propylheptylnaphthalenetrisulfonic acids and salts thereof.

More specific examples of the dialkylnaphthalenesulfonic acid represented by formula (II) and the salt thereof [formula (17) below]

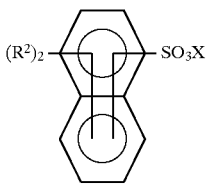

(17)

[R² represents an alkyl group having 1 to 20 carbon atoms; X represents H, an alkali metal or NH₄] include
di(n-propyl)naphthalenesulfonic acids and salts thereof,
di(isopropyl)naphthalenesulfonic acids and salts thereof,
di(sec-butyl)naphthalenesulfonic acids and salts thereof,
dihexylnaphthalenesulfonic acids and salts thereof,
dioctylnaphthalenesulfonic acids and salts thereof,
dinonylnaphthalenesulfonic acids and salts thereof,
didodecylnaphthalenesulfonic acids and salts thereof,
distearylnaphthalenesulfonic acids and salts thereof,
ditetradecylnaphthalenesulfonic acids and salts thereof,
dihexadecylnaphthalenesulfonic acids and salts thereof,
di(2-ethylhexyl)naphthalenesulfonic acids and salts thereof, and
di(2-ethyloctyl)naphthalenesulfonic acids and salts thereof.

More specific examples of the alkylnaphthyl polyoxyethylene ether sulfuric acid ester represented by formula (II) and the salt thereof [formula (18) below]

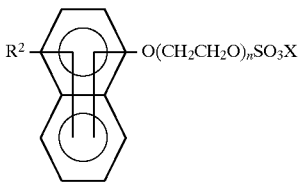

(18)

[R² represents an alkyl group having 1 to 20 carbon atoms; X represents H, an alkali metal or NH₄; n is a positive integer] include
n-butylnaphthyl polyoxyethylene ether sulfuric acid esters and salts thereof,
tert-butylnaphthyl polyoxyethylene ether sulfuric acid esters and salts thereof,
octylnaphthyl polyoxyethylene ether sulfuric acid esters and salts thereof,
nonylnaphthyl polyoxyethylene ether sulfuric acid esters and salts thereof,
dodecylnaphthyl polyoxyethylene ether sulfuric acid esters and salts thereof,
hexadecylnaphthyl polyoxyethylene ether sulfuric acid esters and salts thereof,
stearylnaphthyl polyoxyethylene ether sulfuric acid esters and salts thereof,
tetradecylnaphthyl polyoxyethylene ether sulfuric acid esters and salts thereof,
2-ethylhexylnaphthyl polyoxyethylene ether sulfuric acid esters and salts thereof,
2-butyloctylnaphthyl polyoxyethylene ether sulfuric acid esters and salts thereof,
2-amylnonylnaphthyl polyoxyethylene ether sulfuric acid esters and salts thereof, and
n-propylheptylnaphthyl polyoxyethylene ether sulfuric acid esters and salts thereof.

More specific examples of the alkylnaphthyl di(polyoxyethylene ether sulfuric acid ester) represented by formula (II) and the salt thereof [formula (19) below]

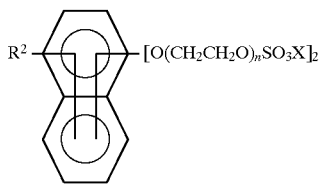

(19)

[R² represents an alkyl group having 1 to 20 carbon atoms; X represents H, an alkali metal or NH₄; n is a positive integer] include
n-butylnaphthyl di(polyoxyethylene ether sulfuric acid esters) and salts thereof,
tert-butylnaphthyl di(polyoxyethylene ether sulfuric acid esters) and salts thereof,
octylnaphthyl di(polyoxyethylene ether sulfuric acid esters) and salts thereof,
nonylnaphthyl di(polyoxyethylene ether sulfuric acid esters) and salts thereof,
dodecylnaphthyl di(polyoxyethylene ether sulfuric acid esters) and salts thereof,
hexadecylnaphthyl di(polyoxyethylene ether sulfuric acid esters) and salts thereof,
stearylnaphthyl di(polyoxyethylene ether sulfuric acid esters) and salts thereof,
tetradecylnaphthyl di(polyoxyethylene ether sulfuric acid esters) and salts thereof,
2-ethylhexylnaphthyl di(polyoxyethylene ether sulfuric acid esters) and salts thereof,
2-butyloctylnaphthyl di(polyoxyethylene ether sulfuric acid esters) and salts thereof,
2-amylnonylnaphthyl di(polyoxyethylene ether sulfuric acid esters) and salts thereof, and
n-propylheptylnaphthyl di(polyoxyethylene ether sulfuric acid esters) and salts thereof.

More specific examples of the alkylnaphthyl di(polyoxyethylene ether ethanesulfonic acid) represented by formula (II) and the salt thereof [formula (20) below]

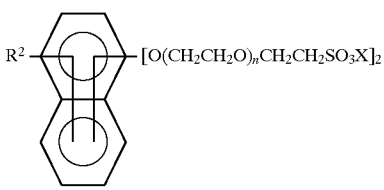

[$R^2$ represents an alkyl group having 1 to 20 carbon atoms; X represents H, an alkali metal or $NH_4$; n is a positive integer] include n-butylnaphthyl di(polyoxyethylene ether ethanesulfonic acids) and salts thereof,
tert-butylnaphthyl di(polyoxyethylene ether ethanesulfonic acids) and salts thereof,
octylnaphthyl di(polyoxyethylene ether ethanesulfonic acids) and salts thereof,
nonylnaphthyl di(polyoxyethylene ether ethanesulfonic acids) and salts thereof,
dodecylnaphthyl di(polyoxyethylene ether ethanesulfonic acids) and salts thereof,
hexadecylnaphthyl di(polyoxyethylene ether ethanesulfonic acids) and salts thereof,
stearylnaphthyl di(polyoxyethylene ether ethanesulfonic acids) and salts thereof,
tetradecylnaphthyl di(polyoxyethylene ether ethanesulfonic acids) and salts thereof,
2-ethylhexylnaphthyl di(polyoxyethylene ether ethanesulfonic acids) and salts thereof,
2-butyloctylnaphthyl di(polyoxyethylene ether ethanesulfonic acids) and salts thereof,
2-amylnonylnaphthyl di(polyoxyethylene ether ethanesulfonic acids) and salts thereof, and
n-propylheptylnaphthyl di(polyoxyethylene ether ethanesulfonic acids) and salts thereof.

Examples of compounds represented by formula (III) include alkyldiphenyl ether disulfonic acids and salts thereof,
alkyldiphenyl ether trisulfonic acids and salts thereof,
alkyldiphenyl ether di(sulfuric acid esters) and salts thereof,
alkyldiphenyl ether di(polyoxyethylene ether sulfuric acid esters) and salts thereof, and
alkyldiphenyl ether di(phosphoric acid esters) and salts thereof.

More specific examples of the alkyl diphenyl ether disulfonic acid represented by formula (III) and the salt thereof [formula (21) below]

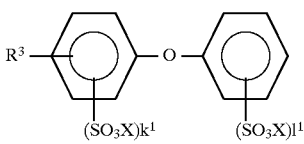

[$R^3$ represents an alkyl group having 1 to 20 carbon atoms; X represents H, an alkali metal or $NH_4$; each of $k^1$ and $l^1$ represents an integer from 0 to 2 (excluding the case wherein both $k^1$ and $l^1$ are 0 or 2] include n-propyldiphenyl ether disulfonic acids and salts thereof,
isopropyldiphenyl ether disulfonic acids and salts thereof,
n-butyldiphenyl ether disulfonic acids and salts thereof,
hexyldiphenyl ether disulfonic acids and salts thereof,
octyldiphenyl ether disulfonic acids and salts thereof,
dodecyldiphenyl ether disulfonic acids and salts thereof,
stearyldiphenyl ether disulfonic acids and salts thereof,
hexadecyldiphenyl ether disulfonic acids and salts thereof,
2-ethylhexylphenyl ether disulfonic acids and salts thereof,
2-amylnonyldiphenyl ether disulfonic acids and salts thereof,
2-propylheptyldiphenyl ether disulfonic acids and salts thereof,
2-butyloctyldiphenyl ether disulfonic acids and salts thereof, and
2-butylhexyldiphenyl ether disulfonic acids and salts thereof.

Useful alkyldiphenyl ether disulfonic acids and salts thereof include
PELEX SS-L and PELEX SS-H (both produced by Kao Corporation, trade names); and
SANDET AL, SANDET ALH and SANDET BL (all produced by Sanyo Kasei Co., Ltd., trade names).

Examples of the fatty acid derivative represented by formula (IV) include
undecanoic acid and metal salts thereof,
dodecanoic acid and metal salts thereof,
tetradecanoic acid and metal salts thereof,
hexadecanoic acid and metal salts thereof,
heptadecanoic acid and metal salts thereof,
octadecanoic acid and metal salts thereof,
eicosanoic acid and metal salts thereof,
10-undecenoic acid and metal salts thereof,
cis-9-octadecenoic acid and metal salts thereof, and
trans-9-octadecenoic acid and metal salts thereof.

Useful fatty acid derivatives include NAA-34, NAA-35, NAA-38, NAA-102, NAA-122, NAA-415, NAA-142, NAA-160, NAA-171, NAA-172, NAA-180, NAA-174 and NAA-175 (all produced by NOF Corporation, trade names);
PALMITIC ACID 60, PALMITIC ACID 90, TST-U, TST-P, STEARIC ACID 85, STEARIC ACID 90, BEHENIC ACID 35, BEHENIC ACID 70, BEHENIC ACID 85, PM#200, PM#300 and PM#810 (all produced by Miyoshi Oil & Fat Co., Ltd., trade names);
SUNFAT12, SUNFAT14, SUNFAT16 and SUNFAT18 (all produced by Lion Corporation, trade names); and
SS-40N, OS SOAP and FR-14 (all produced by Kao Corporation, trade names).

The black dye in the present invention can be produced by an ionic reaction of a conventional nigrosine and at least one anionic surfactant selected from the group consisting of anionic surfactants (a) through (d) above [preferably at least one anionic surfactant selected from the group consisting of the anionic surfactants represented by formulas (I) through (IV) above]. This process can be explained by, for example, a reaction of a nigrosine and an alkylbenzenesulfonic acid, in which an ionic reaction takes place between the nigrosine base and the alkylbenzenesulfonic acid to produce the black dye in the present invention.

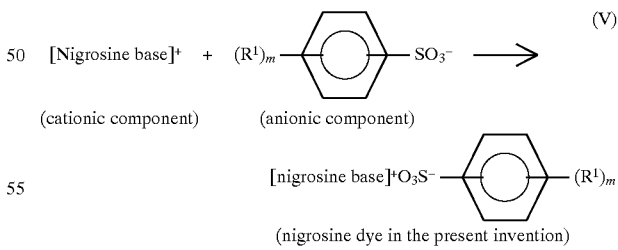

The black dye in the present invention can be produced by any known production method without limitation, as long as a conventional nigrosine and the above-described anionic surfactant are reacted. The reaction can be carried out both in an aqueous system and in a non-aqueous system (organic solvent system).

The thus-obtained black dye in the present invention was proven to be distinct from the starting material nigrosine by TLC and IR spectrum analysis.

The charge molar ratio of nigrosine and the anionic surfactant represented by formulas (I) through (IV) above in the production process for the black dye in the present invention is preferably 0.3 to 1.5 mol of the anionic compound represented by formulas (I) through (IV), per 1 mol of nigrosine, provided that the putative molecular weight of nigrosine is 600 (because nigrosine is a mixture of azine compounds, its average molecular weight is not accurately determinable). If the molar ratio is lower than 0.3, the improving effect on the dispersibility in thermoplastic resin decreases; if it exceeds 1.5, the resulting black dye is likely to melt and difficult to take out as a crystal. The molar ratio is more preferably 0.7 to 1.0 mol.

The black dye in the present invention becomes more soluble in organic solvents as the amount of anionic surfactant represented by formula (I) through (IV) relative to the starting material nigrosine increases, resulting in improved dispersibility in and/or compatibility in thermoplastic resin in the mixing and molding processes.

With improved solubility in organic solvents, the black dye in the present invention can be used as a coloring agent for various purposes. Examples of such uses include coloring agents for writing tools, coloring agents for printing inks, coloring agents for synthetic resin sheets or film, coloring agents for shoe polishers, coloring agents for leathers, and coloring agents for fibers. The black dye is particularly suited as a coloring dye for strongly demanded inks based on alcohol solvents because of their high safety (e.g., marking pen inks, ink jet printing inks, inks for coloring various synthetic resin films).

Also, the black dye in the present invention can also be used as a near infrared absorbent dye because it has an absorbance in the near infrared band.

Also, the black dye in the present invention can also be used in toners for developing electrostatic images, charge-providing materials, powder paints for electrostatic painting, etc. because it also functions as a positively chargeable charge control agent or charge enhancer.

Furthermore, the black dye in the present invention offers improved heat resistance and light fastness, in comparison with conventional nigrosines.

For these reasons, the colored thermoplastic resin composition of the present invention is stable and unlikely to undergo discoloration or color fading during heating processes such as during extrusion, during pellet drying before molding, and during molding, and is thus capable of forming a uniformly colored molded product. Also, the colored thermoplastic resin composition of the present invention is suited for the formation of molded products required to have light fastness, such as those kept outdoors or under similar conditions.

When the black dye in the present invention is used to color a resin, the resulting colored resin has excellent transparency. In other words, the black dye in the present invention ensured better transparency for colored resin molded products, in comparison with black pigments (e.g., carbon black) and other black dyes as coloring agents, because it is highly compatible with excellently transparent resins (e.g., polycarbonate, polyethylene terephthalate).

When a small amount of dispersing agent is added in the production process for the black dye in the present invention, or in the production process for the colored thermoplastic resin composition of the present invention using said black dye, the reaction of a conventional nigrosine and the anionic surfactants of (a) through (d) [especially anionic surfactants represented by formulas (I) through (IV)] is promoted, and more uniform resin coloring is possible.

Examples of such dispersing agents include SOLSPERSE #3000, SOLSPERSE #13550, SOLSPERSE #17000, SOLSPERSE #24000 and SOLSPERSE #24000GR (all produced by ICI, trade names); and EMULGEN A-60, EMULGEN A-90, EMULGEN A-550, EMULGEN B-66, EMULGEN L-40, EMULGEN 306P, EMULGEN 404, EMULGEN 420, EMULGEN 705, EMULGEN 810, EMULGEN 903, EMULGEN 905, RHEODOL TW-L, RHEODOL TW-S120, RHEODOL TW-320, EMANON 1112, EMANON 3115 and EMANON 3299 (all produced by Kao Corporation, trade names).

The amount of black dye used in the colored thermoplastic resin composition of the present invention is normally 0.001 to 35% by weight, preferably 0.01 to 10% by weight, relative to the thermoplastic resin. In the case of coloring focusing on transparency, the amount of black dye used is preferably 0.01 to 0.05% by weight.

Examples of the transparent thermoplastic resin in the colored thermoplastic resin composition of the present invention include
polycarbonate resin, polyester carbonate resin, polyethylene terephthalate resin, polystyrene resin, acrylic resin,
polyacetal resin, polyphenylene ether resin, acrylonitrile-styrene copolymer resin, acrylonitrile-butadiene-styrene copolymer resin, styrene-methacrylate copolymer resin, styrene-butadiene copolymer resin, styrene-butadiene-methyl methacrylate copolymer resin, a morphous (transparent) nylon,
liquid crystal polymer, thermoplastic norbornane resin;
copolymers or mixtures mainly comprising these polymers; thermoplastic resins prepared by formulating an elastomer such as rubber or a rubber-like resin therein; and polymer alloys containing not less than 10% by weight of these resins.

From the viewpoint of light fastness, light ray transmittance, mechanical strength, etc., preference is given to polyethylene terephthalate resin, polymethyl methacrylate resin, polycarbonate resin, polystyrene resin, acrylonitrile-styrene copolymer resin, acrylic resin, acrylonitrile-butadiene-styrene copolymer resin, and polyacetal resin, with greater preference given to polycarbonate resin, polyethylene terephthalate resin, polystyrene resin, acrylonitrile-styrene copolymer resin and acrylic resin.

The colored thermoplastic resin composition of the present invention may incorporate appropriate amounts of various fibrous reinforcing materials according to use and purpose. Such fibrous reinforcing materials may be any ones without limitation, as long as they can be used to reinforce conventional synthetic resins. Examples of useful fibrous reinforcing materials include glass fiber, carbon fiber and organic fibers (aramid, polyphenylene sulfide, nylon, polyester, liquid crystal polymer, etc.).

For the purpose of reinforcing a resin required to be transparent, glass fiber is preferred. When glass fiber is used, it may be of alkali-containing glass, low-alkali glass or alkali-free glass, with preference given to E glass and T glass. The glass fiber used preferably has a fiber length of 2 to 15 mm and a fiber diameter of 1 to 20 $\mu$m. The glass fiber is not subject to limitation as to form. For example, the glass fiber may be in the form of roving, milled fiber, chopped strand, or the like. Such forms of glass fiber may be used singly, or in combination of two or more kinds.

The amount of glass fiber used is preferably 5 to 120% by weight relative to the thermoplastic resin. Amounts lower than 5% by weight and those exceeding 120% by weight are inappropriate because sometimes satisfactory reinforcing effect of glass fiber is not obtained in the former case, and because moldability tends to decrease in the latter case. This amount is preferably 10 to 60% by weight, more preferably 20 to 50% by weight.

The colored thermoplastic resin composition of the present invention may contain various additives as necessary. Examples of such additives include coloring auxiliaries, dispersing agents, fillers, stabilizers, plasticizers, modifiers, ultraviolet absorbents or light stabilizers, antioxidants, antistatic agents, lubricants, release agents, crystallization promoters, crystal nucleating agents, flame retardants and elastomers for improved impact resistance.

As coloring auxiliaries, small amounts of inorganic pigments, organic pigments or organic dyes, for example, can be used to enhance coloring power, improve heat resistance and light fastness, to adjust color tone, or to accomplish other purposes.

Examples of modifiers include silicon compounds such as amino-modified silicone oil and alkyl-modified silicone oil.

Examples of ultraviolet absorbents or light stabilizers include benzotriazole compounds, benzophenone compounds, salicylate compounds, cyanoacrylate compounds, benzoate compounds, oxalide compounds, hindered amine compounds and niccolates.

Examples of antioxidants include phenol compounds, phosphorus compounds, sulfur compounds and thioether compounds.

Examples of antibacterial/antifungal agents include 2-(4'-thiazolyl)-benzimidazole, 10,10'-oxybisphenoxarsine, N-(fluorodichloromethylthio)phthalimide and bis(2-pyridylthio-1-oxide)zinc.

Examples of flame retardants include halogen-containing compounds such as tetrabromobisphenol A derivatives, hexabromodiphenyl ether and tetrabromophthalic anhydride; phosphorus-containing compounds such as triphenyl phosphate, triphenyl phosphite, red phosphorus and ammonium polyphosphate; nitrogen-containing compounds such as urea and guanidine; silicon-containing compounds such as silicone oil, organic silane and aluminum silicate; and antimony compounds such as antimony trioxide and antimony phosphate.

Examples of lubricants include esters of aliphatic alcohols and partial esters and partial ethers of polyhydric alcohols.

Examples of inorganic fillers include glass flake, glass beads, silica, quartz, amorphous silicic acid, talc, magnesium carbonate, calcium carbonate, alumina, montmorillonite, metal powder, kaolin, calcium silicate, mica and wallastonite.

The colored thermoplastic resin composition of the present invention can be prepared by mixing the starting materials by an optionally chosen method. Normally, it is preferable to as uniformly mix these components as possible. For example, it can be prepared by uniformly mixing all starting materials in a mechanical mixer such as a blender, a kneader, a banbury mixer, a roll, or an extruder. Alternatively, it can be obtained by mixing some starting materials in a mechanical mixer, and subsequently adding the remaining components and uniformly mixing them. It can also be obtained as colored particle (colored pellets) by kneading the starting materials, previously blended in a dry state, in a molten state using a heated extruder, to obtain a uniform mixture, extruding the mixture into a needle form, and subsequently cutting it into pieces of desired length.

Also, a master batch for the colored thermoplastic resin composition of the present invention can be obtained by an optionally chosen method. For example, it can be obtained by mixing a master batch base thermoplastic resin, in a powder or pellet form, and a coloring agent, in a mechanical mixer such as a tumbler or a super mixer, and subsequently thermally melting the mixture using an extruder, a batch kneader, a roll kneader, or the like, to yield pellets or coarse particles. Also, a master batch can be obtained, by for example, adding a coloring agent to a master batch thermoplastic resin, while remaining in a solution after synthesis, and subsequently removing the solvent.

The colored thermoplastic resin composition of the present invention can be molded by various procedures in common use. For example, it can be molded from colored pellets using a molding machine such as an extruder, an injection molding machine or a roll mill. Also, it can be molded by mixing in an appropriate mixer a thermoplastic resin with transparency, in a pellet or powder form, pulverized coloring agents, and various additives used as necessary, and molding this mixture using a molding machine. It is also possible to add a coloring agent to a monomer containing an appropriate polymerization catalyst, polymerizing this mixture into a desired thermoplastic resin, and mold this resin by an appropriate method. Molding can be achieved by any molding methods in common use, including injection molding, extrusion molding, compression molding, foaming molding, blow molding, vacuum molding, injection blow molding, rotary molding, calender molding and solution casting.

EXAMPLES

Figure 1:
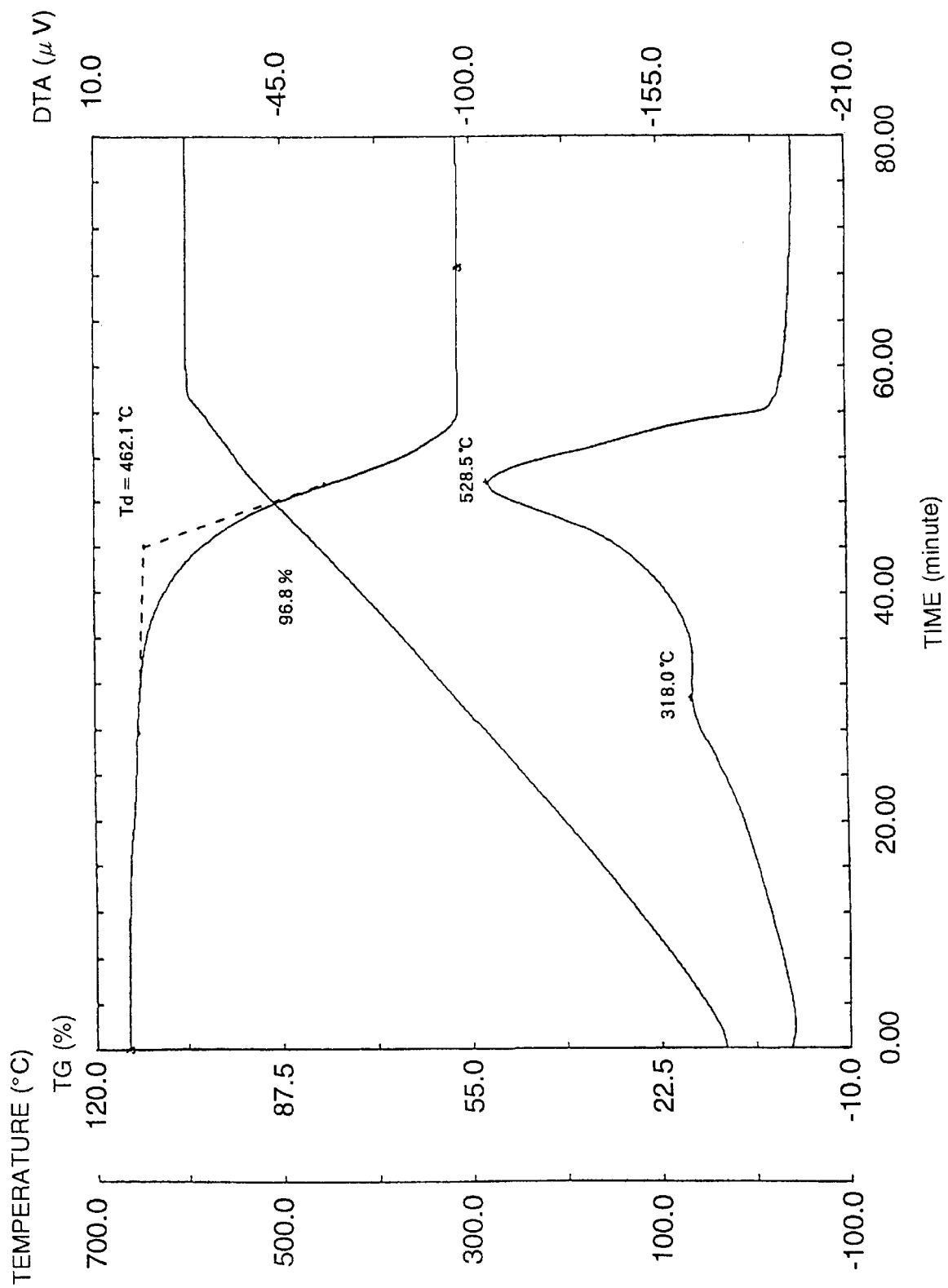
FIG. 1 is a TG/DTA chart of the black dye in the present invention.

The present invention is hereinafter described in more detail by means of the following examples, which are not to be construed as limitative.

Production Examples 1 through 15 pertain to the production of the black dye in the present invention by reaction of a conventional nigrosine and one of the anionic surfactants (a) through (d) above.

Production Example 1: Production of black dye 100 g of NIGROSINE BASE EX (trade name for nigrosine produced by Orient Chemical Industries Ltd.) was dispersed in 300 g of ethanol and heated to 60° C., after which 38 g of an alkylbenzenesulfonic acid (produced by Lion Corporation, trade name: LIPON LH-200) was added. This mixture was heated to 80° C. and reacted for 3 hours. The reaction mixture was then filtered, while it remained hot; the solvent was evaporated and recovered from the filtrate using a rotary evaporator (produced by Tokyo Rika, trade name: N-2-29) to yield 131 g of a black dye.

Production Examples 2 through 14: Production of black dyes

Black dyes were obtained in the same manner as in Production Example 1, except that the alkylbenzenesulfonic acid used in Production Example 1 was replaced with the respective compounds shown in Table 1. In Production Examples 5, 6, 7, 10, 13 and 14, NIGROSINE BASE EX (trade name for nigrosine produced by Orient Chemical Industries Ltd.) was replaced with Spirit Black SB (trade name for nigrosine produced by Orient Chemical Industries Ltd.).

TABLE 1

Compounds of formulas (I) through (IV)

| | Chemical name | Trade name and manufacturer | Acitve ingredient | Content amount (g) | Yield (g) |
|---|---|---|---|---|---|
| Production Example 2 | Alkylbenzenesulfonic acid | LIPON LH-200, produced by Lion Corporation | 96% w/w | 54 | 146 |
| Production Example 3 | Alkylbenzenesulfonic acid | LIPON LH-200, produced by Lion Corporation | 96% w/w | 27 | 120 |
| Production Example 4 | Alkylbenzenesulfonic acid | LIPON LH-200, produced by Lion Corporation | 96% w/w | 64 | 156 |
| Production Example 5 | Sodium alkylnaphthalene-sulfonate | PELEX NB-L, produced by Kao Corporation | 35% w/w | 95 | 96 |
| Production Example 6 | Sodium alkylnaphthalene-sulfonate | PELEX NB-L, produced by Kao Corporation | 35% w/w | 136 | 111 |
| Production Example 7 | Alkyldiphenyl ether sodium disulfonate | SANDET BL, produced by Sanyo Kasei Co., Ltd. | 45% w/w | 143 | 107 |
| Production Example 8 | Alkylphenyl polyoxyethylene ether sulfuric acid ester | HITENOL N-07, produced by Dai-ichi Kogyo Seiyaku Co., Ltd. | 92% w/w | 53 | 139 |
| Production Example 9 | Alkylphenyl polyoxyethylene ether sulfuric acid ester | HITENOL N-07, produced by Dai-ichi Kogyo Seiyaku Co., Ltd. | 92% w/w | 53 | 159 |
| Production Example 10 | Alkylphenyl polyoxyethylene ether sodium ethanesulfonate | Lionol OAI-N, produced by Lion Corporation | 19% w/w | 233 | 129 |
| Production Example 11 | Alkylbenzenesulfonic acid | LIPON LH 200, produced by Lion Corporation | 96% w/w | 27 | 123 |
| | Sodium alkylnaphthalene-sulfonate | PELEX NB-L, produced by Kao Corporation | 35% w/w | 47 | |
| Production Example 12 | Alkylbenzenesulfonic acid | LIPON LH-200, produced by Lion Corporation | 96% w/w | 27 | 138 |
| | Alkylphenyl polyoxyethylene ether phosphoric acid ester | PHOSPHANOL RE-210, produced by Toho Chemical Industry Co., Ltd. | 99% w/w | 35 | |
| Production Example 13 | Sodium stearate | SS-40N, produced by Kao Corporation | 100% w/w | 51 | 135 |
| Production Example 14 | Potassium oleate | FR-14, produced by Kao Corporation | 100% w/w | 54 | 137 |

For example, when the anionic surfactant used was an alkylbenzenesulfonic acid at a molar ratio of 0.7 (Production Example 1) or 1.0 (Production Example 2) relative to the nigrosine used, when the anionic surfactant used was an alkylphenyl polyoxyethylene ether sulfuric acid ester (Production Example 8), and when the anionic surfactant used was a polyoxyethylene alkylphenyl ether sodium ethanesulfonate (Production Example 10), improved solubility in organic solvents were obtained, in comparison with the starting material NIGROSINE BASE EX, as shown in Table 2 (comparison of solubility in organic solvents). In Production Example 2, in particular, further improved solubility in organic solvents was obtained, in comparison with Production Example 1.

Figure 2:
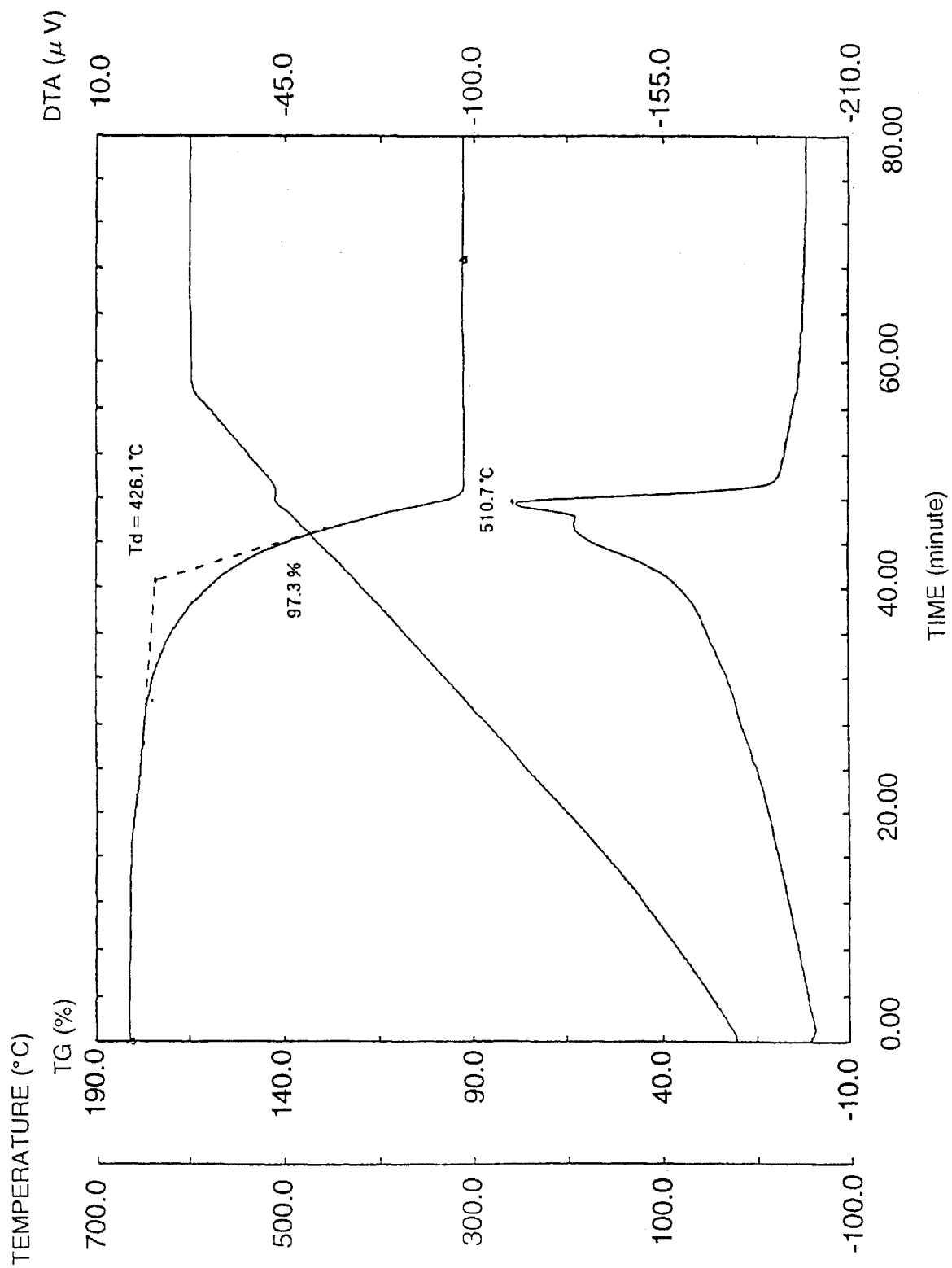
FIG. 2 is a TG/DTA chart of NIGROSINE BASE EX.

Comparing a TG/DTA chart of a black dye resulting from a reaction of a nigrosine and an alkylbenzenesulfonic acid in a molar ratio of 0.7 (FIG. 1) and a TG/DTA chart of NIGROSINE BASE EX (trade name for nigrosine produced by Orient Chemical Industries Ltd.) (FIG. 2), for example, it is evident that the combustion (decomposition) temperature of NIGROSINE BASE EX is 510.7° C. (Td=426.1° C.), while the combustion (decomposition) temperature of the black dye in the present invention is 528.5° C. (Td=462.1° C.), i.e., the combustion (decomposition) temperature of the black dye in the present invention is higher by about 18° C. (Td difference=about 36° C.) than that of the starting material nigrosine.

Comparing light fastness (testing conditions shown below), NIGROSINE BASE EX (trade name for nigrosine produced by Orient Chemical Industries Ltd.) showed a ΔE value of 2.38, while that of the black dye in the present

TABLE 2

| | NIGROSINE BASE EX | Dye of Production Example 1 | Dye of Production Example 2 | Dye of Production Example 8 | Dye of Production Example 10 |
|---|---|---|---|---|---|
| Ethanol | Not more than 1% w/w | 15% w/w | Not less than 30% w/w | 5% w/w | 10% w/w |
| n-Butanol | Not more than 1% w/w | 5% w/w | Not less than 30% w/w | 2% w/w | 5% w/w |
| Methyl ethyl ketone | Not more than 1% w/w | 15% w/w | Not less than 30% w/w | 10% w/w | 2% w/w | invention had a ΔE value of 0.58. This finding demonstrates that the black dye undergoes less color fading and discoloration and has improved light fastness.

[Light fastness test conditions]

In accordance with the molding method described in Example 1 below, colored polycarbonate resin plates of a dye concentration of 0.05% w/w were prepared. Each plate was irradiated with light for 80 hours using a carbon arc light fastness tester. Using a high-precision colorimeter (produced by JUKI, trade name: JP7100F), the amount of color fading and discoloration ΔE between before and after light irradiation was determined and compared between the plate colored with the starting material nigrosine and the plate colored with the black dye in the present invention.

Production Example 15: Production of black dye in the presence of additional dispersing agent 100 g of NIGROSINE BASE EX (trade name for nigrosine produced by Orient Chemical Industries Ltd.) was dispersed in 300 g of ethanol and heated to 60° C., after which 38 g of an alkylbenzenesulfonic acid (produced by Lion Corporation, trade name: LIPON LH-200) and 5 g of SOLSPERSE #13550 (trade name for dispersing agent produced by ICI) were added. This mixture was heated to 80° C. and reacted for 3 hours. The reaction mixture was then filtered, while it remained hot; the solvent was evaporated and recovered from the filtrate using a rotary evaporator (produced by Tokyo Rika, trade name: N-2-29) to yield 129 g of a black dye.

Examples 1 through 16 and Comparative Examples 1 and 2 pertain to black polycarbonate resin compositions containing no fibrous reinforcing materials.

Example 1

500 g of a polycarbonate resin (produced by Mitsubishi Chemical Corporation, trade name: NOVAREX) and 0.25 g of the black dye of Production Example 1 were placed in a stainless steel tumbler and thoroughly stirred for 1 hour.

This mixture was kneaded in a molten state at 300° C. using a vent-type extruder (produced by Enpla Sangyo, trade name: E30SV), after which it was treated by a conventional method to prepare colored pellets, which were then vacuum dried at 120° C. for 6 hours.

The dried pellets were injection molded at 300° C. by an ordinary method using an injection molding machine (produced by Kawaguchi Tekko, trade name: KM50-C) to yield a bluish black molded plate (48×86×3 mm) wherein the resin and dye were well compatible with each other.

The results of assessment of the appearance, surface gloss, light fastness and heat resistance of this molded plate are shown in Table 3. The results of determination of the Izod impact value, tensile strength, elongation, bending strength and bending elastic modulus of this molded plate are shown in Table 4.

The criteria and methods used for each assessment or measurement item are described below. The same criteria and methods as those described below were used in Examples and Comparative Examples below.

[Appearance and surface gloss assessment (coloring agent dispersibility and compatibility test)]

The state of coloring and surface gloss were evaluated by visual inspection of the test piece under standard light C (JIS L0804). Assessment criteria ⊚: Uniformly and distinctly colored, and rich in gloss.

○: Uniformly colored, and glossy.

Δ: Partially ununiformly colored, and partially glossless.

×: Generally ununiformly colored, and glossless.

[Light fastness test and assessment]

In accordance with the light fastness test specifications (JIS K7102), using an ultraviolet long life fade meter (produced by Suga Shikenki, trade name: FAL-SH-C), the test piece was irradiated with light for 400 hours, after which the pre-irradiation test piece and the post-irradiation test piece were compared on a blue scale (JIS L0841 method). In general, test pieces rated lower are judged to have greater discoloration and fading.

[Heat resistance test and assessment]

500 g of a thermoplastic resin and 0.25 g of a coloring agent were placed in a stainless steel tumbler and thoroughly stirred for 1 hour. This mixture was kneaded in a molten state using a vent-type extruder, after which it was treated by a conventional method to prepare colored pellets, which were then vacuum dried at 120° C. for 6 hours. The dried pellets were placed in an injection molding machine and kept standing at 310° C. therein for 5 minutes, after which they were injection molded to yield a molded plate. The molded plate was assessed on a blue scale (JIS L0841), in comparison with the standard molded plate. In general, test pieces rated lower are judged to have greater discoloration and fading.

[Determination of Izod impact value]

In accordance with the Izod impact value test specifications (JIS K6810, with notch), the Izod impact value of the test piece was determined using an Izod impact value tester (produced by Toyo Seiki, trade name: Universal Impact Tester B-122403800).

5 [Determination of tensile strength and elongation]

In accordance with the test specifications for tensile strength (JIS K7113), the tensile strength and elongation of the test piece were determined using a tensile strength tester (produced by Shimadzu Corporation, trade name: AUTOGRAPH DSS-5000).

[Determination of bending strength and bending elastic modulus]

In accordance with the bending test specifications (JIS K7055), the bending strength and bending elastic modulus of the test piece were determined using a bending tester (produced by Shimadzu Corporation, trade name: AUTOGRAPH AG-50KNE).

Examples 2 through 13

Uniformly brilliantly black colored molded plates (48×86×3 mm) were obtained in the same manner as in Example 1, except that the black dye of Production Example 1 used in Example 1 was replaced with the respective black dyes of Production Examples shown in Table 3.

The results of assessment of the appearance, surface gloss, light fastness and heat resistance of each molded plate are shown in Table 3. The results of determination of the Izod impact value, tensile strength, elongation, bending strength and bending elastic modulus of the molded plate of Example 10 are shown in Table 4.

Example 14

Polycarbonate resin (produced by Mitsubishi Chemical Corporation, trade name: NOVAREX) . . . 500 g Black dye (black dye of Production Example 1) . . . 0.20 g Metal complex azo dye (compound of formula (VI) below) . . . 0.05 g The above ingredients were treated for molding in the same manner as in Example 1 to yield a uniformly brilliantly black colored molded plate (48×86×3 mm).

The results of assessment of the appearance, surface gloss, light fastness and heat resistance of this molded plate are shown in Table 3.

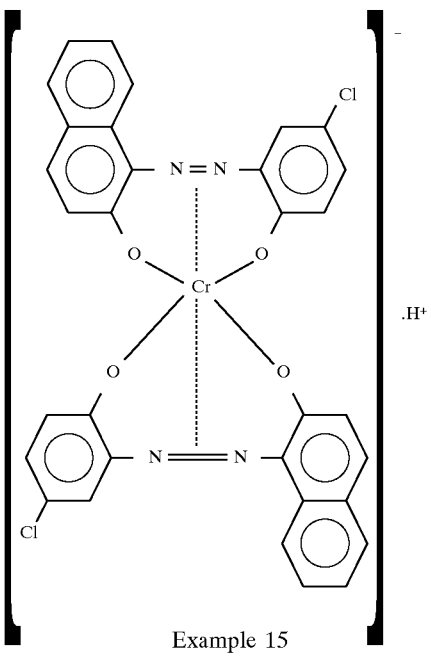

(VI)

Example 15

Polycarbonate resin (produced by Mitsubishi Chemical Corporation, trade name: NOVAREX) . . . 500 g Black dye (black dye of Production Example 1) . . . 0.20 g Phthalocyanine blue (produced by Toyo Ink Mfg. Co., Ltd., trade name: LIONOL BLUE NCR TONER) . . . 0.05 g The above ingredients were treated for molding in the same manner as in Example 1 to yield a uniformly brilliantly black colored molded plate (48×86×3 mm).

The results of assessment of the appearance, surface gloss, light fastness and heat resistance of this molded plate are shown in Table 3.

Example 16

Polycarbonate resin (produced by Mitsubishi Chemical Corporation, trade name: NOVAREX) . . . 500 g Black dye (black dye of Production Example 1) . . . 0.20 g Carbon black (produced by Mitsubishi Chemical Corporation, trade name: #960) . . . 0.05 g The above ingredients were treated for molding in the same manner as in Example 1 to yield a uniformly brilliantly black colored molded plate (48×86×3 mm).

The results of assessment of the appearance, surface gloss, light fastness and heat resistance of this molded plate are shown in Table 3.

Comparative Example 1

An ununiformly black colored molded plate of poor nigrosine dispersion (48×86×3 mm) was obtained in the same manner as in Example 1, except that the black dye of Production Example 1 used in Example 1 was replaced with NIGROSINE BASE EX (trade name for nigrosine produced by Orient Chemical Industries Ltd.).

The results of assessment of the appearance, surface gloss, light fastness and heat resistance of this molded plate are shown in Table 3. The results of determination of the Izod impact value, tensile strength, elongation, bending strength and bending elastic modulus of this molded plate are shown in Table 4.

Comparative Example 2

An ununiformly black colored molded plate of poor carbon black dispersion (48×86×3 mm) was obtained in the same manner as in Example 1, except that the black dye of Production Example 1 used in Example 1 was replaced with carbon black (produced by Mitsubishi Chemical Corporation, trade name: #960).

The results of assessment of the appearance, surface gloss, light fastness and heat resistance of this molded plate are shown in Table 3. The results of determination of the Izod impact value, tensile strength, elongation, bending strength and bending elastic modulus of this molded plate are shown in Table 4.

TABLE 3

| | Coloring agent | Appearance/ surface gloss | Fastness test | Heat resistance test |
|---|---|---|---|---|
| Example 1 | Production Example 1 | ◎ | Grade 7 | Grade 4 |
| Example 2 | Production Example 2 | ◎ | Grade 7 | Between Grade 4 and 5 |
| Example 3 | Production Example 3 | ◎ | Grade 7 | Grade 4 |
| Example 4 | Production Example 4 | ◎ | Grade 7 | Grade 5 |
| Example 5 | Production Example 5 | ◎ | Grade 7 | Grade 5 |
| Example 6 | Production Example 6 | ◎ | Grade 7 | Grade 5 |
| Example 7 | Production Example 7 | ○ | Grade 7 | Between Grade 4 and 5 |
| Example 8 | Production Example 8 | ○ | Grade 7 | Grade 5 |
| Example 9 | Production Example 10 | ◎ | Grade 7 | Grade 4 |
| Example 10 | Production Example 12 | ◎ | Grade 7 | Eetween Grade 4 and 5 |
| Example 11 | Production Example 13 | ◎ | Grade 7 | Between Grade 4 and 5 |
| Example 12 | Production Example 14 | ◎ | Grade 7 | Between Grade 4 and 5 |
| Example 13 | Production Example 15 | ◎ | Grade 7 | Grade 5 |
| Example 14 | Production Example 1 | ◎ | Grade 7 | Grade 5 |
| Example 15 | Production Example 1 | ◎ | Grade 7 | Grade 5 |
| Example 16 | Production Example 1 | ○ | Grade 7 | Grade 5 |
| Comparative Example 1 | NIGROSINE BASE EX | Δ | Grade 5 | Between Grade 3 and 4 |
| Comparative Example 2 | Carbon black | × | Grade 8 | Grade 5 |

TABLE 4

|  | Coloring agent | Izod impact value (KJ/m$^2$) | Tensile strength (N/mm$^2$) | Elongation (%) | Bending strength (N/mm$^2$) | Bending elastic modulus (N/mm$^2$) |
|---|---|---|---|---|---|---|
| Example 1 | Production Example 1 | 71.6 | 62.8 | 118 | 87.1 | 2177.1 |
| Example 10 | Production Example 13 | 56.4 | 64.3 | 122 | 91.0 | 2235.9 |
| Comparative Example 1 | NIGROSINE BASE EX | 18.9 | 61.7 | 98 | 90.0 | 2255.5 |
| Comparative Example 2 | Carbon black | 20.5 | 61.3 | 92 | 89.9 | 2196.7 |

Examples 17 through 19 and Comparative Example 3 pertain to black polycarbonate resin compositions reinforced with glass fiber contained therein.

Example 17

500g of a fiber-reinforced polycarbonate resin (produced by Mitsubishi Gas Chemical Co., Inc., trade name: GS-2020M) and 0.25 g of the black dye of Production Example 1 were placed in a stainless steel tumbler and thoroughly stirred for 1 hour.

This mixture was kneaded in a molten state at 300° C. using a vent-type extruder (produced by Enpla Sangyo, trade name: E30SV), after which it was treated by a conventional method to prepare colored pellets, which were then vacuum dried at 120° C. for 6 hours.

The dried pellets were injection molded at 300° C. by an ordinary method using an injection molding machine (produced by Kawaguchi Tekko, trade name: KM50-C) to yield a bluish black molded plate (48×86×3 mm) wherein the resin and dye were well compatible with each other.

The results of assessment of the appearance, surface gloss, light fastness and heat resistance of this molded plate are shown in Table 5.

Examples 18 and 19

Uniformly brilliantly black colored molded plates (48×86×3 mm) were obtained in the same manner as in Example 17, except that the black dye of Production Example 1 used in Example 17 was replaced with the respective black dyes of Production Examples shown in Table 5.

The results of assessment of the appearance, surface gloss, light fastness and heat resistance of each molded plate are shown in Table 5.

Comparative Example 3

An ununiformly black colored molded plate of poor nigrosine dispersion (48×86×3 mm) was obtained in the same manner as in Example 17, except that the black dye of Production Example 1 used in Example 17 was replaced with NIGROSINE BASE EX (trade name for nigrosine produced by Orient Chemical Industries Ltd.).

The results of assessment of the appearance, surface gloss, light fastness and heat resistance of this molded plate

TABLE 5

|  | Coloring agent | Appearance/ surface gloss | Light fastness test | Heat resistance test |
|---|---|---|---|---|
| Example 17 | Production Example 1 | ◯ | Grade 7 | Grade 4 |
| Example 18 | Production Example 8 | ◯ | Grade 7 | Grade 4 |
| Example 19 | Production Example 11 | ◯ | Grade 7 | Grade 4 |
| Comparative Example 3 | NIGROSINE BASE EX | × | Between Grade 4 and 5 | Grade 3 |

Example 20

Transparency comparison test using black polycarbonate resin compositions

Several tens of molded plates (48×86×3 mm) of three concentrations (0.01% w/w, 0.03% w/w, 0.05% w/w) of the black dye of Production Example 1 in polycarbonate resin were prepared in the same manner as in Example 1.

Several tens of molded plates (48×86×3 mm) were prepared at the same three concentrations and in the same manner as above, except that the black dye of Production Example 1 was replaced with NIGROSINE BASE EX (trade name for nigrosine produced by Orient Chemical Industries Ltd.) or carbon black (produced by Mitsubishi Chemical Corporation, trade name: #960).

For each kind of molded plates, the maximum number of superposed plates allowing light transmission was determined using a transmission/reflection densitometer (produced by Macbeth, trade name: TR-927). The results are shown in Table 6.

TABLE 6

| Coloring agent concentration | Resin composition incorporating the black dye of Production Example 1 | Resin composition incorporating NIGROSINE BASE EX | Resin composition incorporating carbon black |
| --- | --- | --- | --- |
| 0.01% w/w | 20 plates | 10 plates | 2 plates |
| 0.03% w/w | 6 plates | 3 plates | No transmission |
| 0.05% w/w | 3 plates | 2 plates | No transmission |

Examples 21 through 25 and Comparative Examples 4 and 5 pertain to black polystyrene resin compositions containing no fibrous reinforcing materials.

Example 21

500g of a polystyrene resin (produced by Mitsubishi Chemical Corporation, trade name: DIAREX HF-77307) and 0.25 g of the black dye of Production Example 1 were placed in a stainless steel tumbler and thoroughly stirred for 1 hour.

This mixture was kneaded in a molten state at 220° C. using a vent-type extruder (produced by Enpla Sangyo, trade name: E30SV), after which it was treated by a conventional method to prepare colored pellets, which were then vacuum dried at 120° C. for 6 hours.

The dried pellets were injection molded at 220° C. by an ordinary method using an injection molding machine (produced by Kawaguchi Tekko, trade name: KM50-C) to yield a bluish black molded plate (48×86×3 mm) wherein the resin and dye were well compatible with each other.

The results of assessment of the appearance, surface gloss, light fastness and heat resistance of this molded plate are shown in Table 7.

Examples 22 through 25

Uniformly brilliantly black colored molded plates (48×86×3 mm) were obtained in the same manner as in Example 21, except that the black dye of Production Example 1 used in Example 21 was replaced with the respective black dyes of Production Examples shown in Table 7.

The results of assessment of the appearance, surface gloss, light fastness and heat resistance of each molded plate are shown in Table 7.

Comparative Example 4

An ununiformly black colored molded plate of poor nigrosine dispersion (48×86×3 mm) was obtained in the same manner as in Example 21, except that the black dye of Production Example 1 used in Example 21 was replaced with NIGROSINE BASE EX (trade name for nigrosine produced by Orient Chemical Industries Ltd.).

The results of assessment of the appearance, surface gloss, light fastness and heat resistance of this molded plate are shown in Table 7.

Comparative Example 5

An ununiformly black colored molded plate of poor carbon black dispersion (48×86×3 mm) was obtained in the same manner as in Example 21, except that the black dye of Production Example 1 used in Example 21 was replaced with carbon black (produced by Mitsubishi Chemical Corporation, trade name: #960).

The results of assessment of the appearance, surface gloss, light fastness and heat resistance of each molded plate are shown in Table 7.

TABLE 7

| | Coloring agent | Appearance/ surface gloss | Light fastness test | Heat resistance test |
| --- | --- | --- | --- | --- |
| Example 21 | Production Example 1 | ⊙ | Grade 7 | Grade 5 |
| Example 22 | Production Example 5 | ⊙ | Grade 7 | Grade 5 |
| Example 23 | Production Example 8 | ⊙ | Grade 7 | Grade 5 |
| Example 24 | Production Example 10 | ◯ | Grade 7 | Between Grade 4 and 5 |
| Example 25 | Production Example 15 | ⊙ | Grade 7 | Grade 5 |
| Comparative Example 4 | NIGROSINE BASE EX | Δ | Grade 5 | Between Grade 3 and 4 |
| Comparative Example 5 | Carbon black | × | Grade 8 | Grade 5 |

Examples 26 through 34 and Comparative Examples 6 and 7 pertain to black polyethylene terephthalate resin compositions containing no fibrous reinforcing materials.

Example 26

500 g of a polyethylene terephthalate resin (produced by Unitica Corporation, trade name: NES2040) and 0.25 g of the black dye of Production Example 1 were placed in a stainless steel tumbler and thoroughly stirred for 1 hour.

This mixture was kneaded in a molten state at 260° C. using a vent-type extruder (produced by Enpla Sangyo, trade name: E30SV), after which it was treated by a conventional method to prepare colored pellets, which were then vacuum dried at 120° C. for 6 hours.

The dried pellets were injection molded at 260° C. by an ordinary method using an injection molding machine (produced by Kawaguchi Tekko, trade name: KM50-C) to yield a bluish black molded plate (48×86×3 mm) wherein the resin and dye were well compatible with each other.

The results of assessment of the appearance, surface gloss, light fastness and heat resistance of this molded plate are shown in Table 8. The results of determination of the Izod impact value, tensile strength, elongation, bending strength and bending elastic modulus of this molded plate are shown in Table 9.

Examples 27 through 34

Uniformly brilliantly black colored molded plates (48×86×3 mm) were obtained in the same manner as in Example 26, except that the black dye of Production Example 1 used in Example 26 was replaced with the respective black dyes of Production Examples shown in Table 8.

The results of assessment of the appearance, surface gloss, light fastness and heat resistance of each molded plate are shown in Table 8. The results of determination of the Izod impact value, tensile strength, elongation, bending strength and bending elastic modulus of each molded plate are shown in Table 9.

Comparative Example 6

A uniformly black colored molded plate (48×86×3 mm) was obtained in the same manner as in Example 26, except that the black dye of Production Example 1 used in Example 26 was replaced with NIGROSINE BASE SAP (trade name for nigrosine produced by Orient Chemical Industries Ltd.).

The results of assessment of the appearance, surface gloss, light fastness and heat resistance of this molded plate are shown in Table 8. The results of determination of the Izod impact value, tensile strength, elongation, bending strength and bending elastic modulus of this molded plate are shown in Table 9.

Comparative Example 7

An ununiformly black colored molded plate of poor carbon black dispersion (48×86×3 mm) was obtained in the same manner as in Example 26, except that the black dye of Production Example 1 used in Example 26 was replaced with carbon black (produced by Mitsubishi Chemical Corporation, trade name: #960).

The results of assessment of the appearance, surface gloss, light fastness and heat resistance of each molded plate are shown in Table 8. The results of determination of the Izod impact value, tensile strength, elongation, bending strength and bending elastic modulus of this molded plate are shown in Table 9.

TABLE 8

|  | Coloring agent | Appearance/ surface gloss | Light fastness test | Heat resistance test |
| --- | --- | --- | --- | --- |
| Example 26 | Production Example 1 | ⊚ | Grade 7 | Grade 5 |
| Example 27 | Production Example 5 | ⊚ | Grade 7 | Grade 5 |
| Example 28 | Production Example 7 | ○ | Grade 7 | Between Grade 4 and 5 |
| Example 29 | Production Example 8 | ⊚ | Grade 7 | Grade 5 |
| Example 30 | Production Example 10 | ⊚ | Grade 7 | Grade 5 |
| Example 31 | Production Example 11 | ⊚ | Grade 7 | Grade 5 |
| Example 32 | Production Example 13 | ⊚ | Grade 7 | Between Grade 4 and 5 |
| Example 33 | Production Example 14 | ⊚ | Grade 7 | Between Grade 4 and 5 |

TABLE 8-continued

|  | Coloring agent | Appearance/ surface gloss | Light fastness test | Heat resistance test |
| --- | --- | --- | --- | --- |
| Example 34 | Production Example 15 | ⊚ | Grade 7 | Grade 5 |
| Comparative Example 6 | NIGROSINE BASE SAP | ○ | Grade 6 | Grade 4 |
| Comparative Example 7 | Carbon black | × | Grade 7 | Grade 5 |

TABLE 9

|  | Coloring agent | Izod impact value (KJ/m$^2$) | Tensile strength (N/mm$^2$) | Elongation (%) | Bending strength (N/mm$^2$) | Bending elastic modulus (N/mm$^2$) |
| --- | --- | --- | --- | --- | --- | --- |
| Example 26 | Production Example 1 | 3.92 | 55.5 | 348 | 76.1 | 2175.4 |
| Example 32 | Production Example 13 | 3.46 | 55.4 | 317 | 76.5 | 2190.9 |
| Comparative Example 6 | NIGROSINE BASE SAP | 3.42 | 53.9 | 266 | 77.9 | 2183.7 |
| Comparative Example 7 | Carbon black | 3.26 | 54.8 | 6 | 75.2 | 2032.5 |

Examples 35 through 37 and Comparative Example 8 pertain to black polyethylene terephthalate resin compositions reinforced with glass fiber contained therein.

Example 35

500g of a fiber-reinforced polyethylene terephthalate resin (produced by dupont, trade name: NC10) and 0.25 g of the black dye of Production Example 1 were placed in a stainless steel tumbler and thoroughly stirred for 1 hour.

This mixture was kneaded in a molten state at 260° C. using a vent-type extruder (produced by Enpla Sangyo, trade name: E30SV), after which it was treated by a conventional method to prepare colored pellets, which were then vacuum dried at 120° C. for 6 hours.

The dried pellets were injection molded at 260° C. by an ordinary method using an injection molding machine (produced by Kawaguchi Tekko, trade name: KM50-C) to yield a bluish black molded plate (48×86×3 mm) wherein the resin and dye were well compatible with each other.

The results of assessment of the appearance, surface gloss, light fastness and heat resistance of this molded plate are shown in Table 10. The results of determination of the Izod impact value, tensile strength, elongation, bending strength and bending elastic modulus of this molded plate are shown in Table 11.

Examples 36 and 37

Uniformly brilliantly black colored molded plates (48×86×3 mm) were obtained in the same manner as in Example 35, except that the black dye of Production Example 1 used in Example 35 was replaced with the respective black dyes of Production Examples shown in Table 10.

The results of assessment of the appearance, surface gloss, light fastness and heat resistance of each molded plate are shown in Table 10. The results of determination of the Izod impact value, tensile strength, elongation, bending strength and bending elastic modulus of each molded plate are shown in Table 11.

Comparative Example 8

A uniformly black colored molded plate (48×86×3 mm) was obtained in the same manner as in Example 35, except that the black dye of Production Example 1 used in Example 35 was replaced with NIGROSINE BASE SAP (trade name for nigrosine produced by Orient Chemical Industries Ltd.).

The results of assessment of the appearance, surface gloss, light fastness and heat resistance of this molded plate are shown in Table 10. The results of determination of the Izod impact value, tensile strength, elongation, bending strength and bending elastic modulus of this molded plate are shown in Table 11.

TABLE 10

|  | Coloring agent | Appearance/ surface gloss | Light fastness test | Heat resistance test |
|---|---|---|---|---|
| Example 35 | Production Example 1 | ◯ | Grade 7 | Grade 4 |
| Example 36 | Production Example 8 | ◯ | Grade 7 | Grade 4 |
| Example 37 | Production Example 13 | ◯ | Grade 7 | Grade 4 |
| Comparative Example 8 | NIGROSINE BASE SAP | Δ | Grade 5 | Between Grade 3 and 4 |

TABLE 11

|  | Coloring agent | Izod impact value (KJ/m$^2$) | Tensile strength (N/mm$^2$) | Bending strength (N/mm$^2$) | Bending elastic modulus (N/mm$^2$) |
|---|---|---|---|---|---|
| Example 35 | Production Example 1 | 3.46 | 49.3 | 94.3 | 9608.6 |
| Example 37 | Production Example 13 | 3.29 | 42.7 | 89.6 | 9755.9 |
| Comparative Example 8 | NIGROSINE BASE SAP | 3.01 | 48.0 | 90.2 | 9744.4 |

The entire disclosure of Japanese Patent Application No. 8-127886 filed on Apr. 23, 1996 including specification, claims and drawings are incorporated herein by reference in their entirety.

What is claimed is:

1. Colored thermoplastic resin composition comprising a transparent thermoplastic resin and a black dye contained therein, wherein said black dye is a black dye obtained by reaction of nigrosine with at least one anionic surfactant selected from the group consisting of (a) sulfuric acid ester series surfactants and the corresponding salts thereof,
   (b) phosphoric acid ester series surfactants and the corresponding salts thereof,
   (c) sulfonic acid series surfactants and the corresponding salts thereof, and
   (d) carboxylic acid series surfactants and the corresponding salts thereof.

2. Composition of claim 1 wherein said anionic surfactant is at least one compound selected from the group consisting of the compounds represented by the following formulas (I) through (IV):

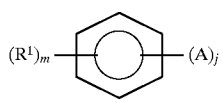
(I)

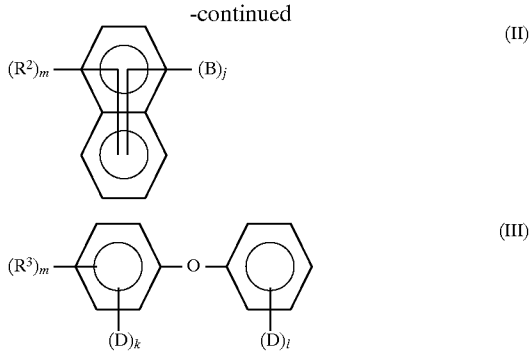

wherein in formulas (I), (II) and (III), each of $R^1$, $R^2$ and $R^3$ independently represents an alkyl group having 1 to 20 carbon atoms, each of A, B and C independently represents (1) $SO_3X$ in which X represents H, an alkali metal or $NH_4$, (2) $CHR^4SO_3X$ in which X is the same as defined above and $R^4$ represents H, an alkyl group having 1 to 20 carbon atoms, or an aryl group or aralkyl group that is substituted or not substituted by an alkyl group, (3) $OSO_3X$ in which X is the same as defined above, (4) $O(CH_2CH_2O)_nSO_3X$ in which X is the same as defined above and n represents a positive integer, (5) $O(CH_2CH_2O)_nCH_2CH_2SO_3X$ in which X and n are the same as defined above, (6) $OPO(OX)(Y)$ in which X is the same as defined above and Y represents OH, OM wherein M represents an alkali metal, $ONH_4$, or $(OCH_2CH_2)_nOR^5$ wherein n is the same as defined above and $R^5$ represents an alkyl group having 1 to 20 carbon atoms, or an aryl group that is substituted or not substituted by an alkyl group, or (7) $O(CH_2CH_2O)_nPO(OX)(Y)$ in which X, n and Y are the same as defined above, j represents an integer from 1 to 3, each of k and l represents an integer from 0 to 3, excluding the case where both k and l are 0, and m represents 1 or 2;

$$C_qH_fCOOE \qquad (IV)$$

wherein in formula (IV), q represents an integer from 10 to 20, f represents 2q+1 or 2q−1, and E represents H, an alkali metal or an alkaline earth metal.

3. Composition of claim 2 wherein the compound represented by formula (I) above is an alkylbenzene sulfonic acid or a salt thereof, an alkylbenzene disulfonic acid or a salt thereof, an alkylphenyl polyoxyethylene ether sulfuric acid ester or a salt thereof, an alkylphenyl polyoxyethylene ether phosphoric acid ester or a salt thereof.

4. Composition of claim 2 wherein the compound represented by formula (II) above is an alkylnaphthalene sulfonic acid or a salt thereof, or an alkylnaphthalene disulfonic acid or a salt thereof.

5. Composition of claim 2 wherein the compound represented by formula (IV) above is stearic acid or an alkali metal salt thereof.

6. Composition of claim 1 wherein said transparent thermoplastic resin is at least one synthetic resin selected from the group consisting of polycarbonate resin, polystyrene resin, polyethylene terephthalate resin, acrylonitrile-styrene copolymer resin and acrylic resin.

7. Composition of claim 2 wherein said transparent thermoplastic resin is at least one synthetic resin selected from the group consisting of polycarbonate resin, polystyrene resin, polyethylene terephthalate resin, acrylonitrile-styrene copolymer resin and acrylic resin.

8. Composition of claim 1 containing a fibrous reinforcing material.

9. Composition of claim 2 containing a fibrous reinforcing material.

10. Composition of claim 6 containing a fibrous reinforcing material.

11. Composition of claim 7 containing a fibrous reinforcing material.

12. Composition of claim 8 wherein said fibrous reinforcing material is glass fiber.

13. Composition of claim 9 wherein said fibrous reinforcing material is glass fiber.

14. Composition of claim 10 wherein said fibrous reinforcing material is glass fiber.

15. Composition of claim 11 wherein said fibrous reinforcing material is glass fiber.

* * * * *